US006938420B2

(12) United States Patent
Kawamura et al.

(10) Patent No.: US 6,938,420 B2
(45) Date of Patent: Sep. 6, 2005

(54) SUPERCHARGER FOR INTERNAL COMBUSTION ENGINE

(75) Inventors: Katsuhiko Kawamura, Yokohama (JP); Kenichi Fujimura, Yokohama (JP); Ryou Ikegami, Yokohama (JP); Susumu Kubo, Yokohama (JP); Hideharu Kadooka, Yokohama (JP); Naoki Mishima, Yokohama (JP); Motoyuki Hattori, Yokohama (JP); Satoshi Shimada, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/623,564

(22) Filed: Jul. 22, 2003

(65) Prior Publication Data

US 2004/0194466 A1 Oct. 7, 2004

(30) Foreign Application Priority Data

| | | |
|---|---|---|
| Aug. 20, 2002 | (JP) | 2002-238894 |
| Nov. 22, 2002 | (JP) | 2002-338999 |
| Jan. 24, 2003 | (JP) | 2003-016201 |
| Jan. 30, 2003 | (JP) | 2003-021667 |
| Feb. 21, 2003 | (JP) | 2003-044794 |

(51) Int. Cl.[7] .......................... F02B 33/00; F02B 37/04; F02B 37/14; F02B 39/10

(52) U.S. Cl. ............................ 60/612; 60/608; 60/609; 60/611; 123/562

(58) Field of Search .......................... 60/607, 608, 609, 60/612, 611; 123/562

(56) References Cited

U.S. PATENT DOCUMENTS

| | | | | |
|---|---|---|---|---|
| 4,669,269 A | | 6/1987 | Dinger et al. | |
| 4,930,315 A | * | 6/1990 | Kanesaka | 60/612 |
| 5,408,979 A | * | 4/1995 | Backlund et al. | 123/562 |
| 5,771,868 A | * | 6/1998 | Khair | 60/609 |
| 6,062,026 A | | 5/2000 | Woollenweber et al. | |
| 6,722,129 B2 | * | 4/2004 | Criddle et al. | 60/612 |
| 6,755,022 B2 | * | 6/2004 | Kim et al. | 60/608 |

FOREIGN PATENT DOCUMENTS

| | | |
|---|---|---|
| DE | 197 08 721 A1 | 9/1998 |
| DE | 199 05 112 A1 | 8/2000 |
| EP | 1 070 837 A2 | 2/2001 |
| JP | 6-207522 A | 7/1994 |
| JP | 2000-230427 A | 8/2000 |
| JP | 2001-280145 A | 10/2001 |
| JP | 2002-21573 A | 1/2002 |

* cited by examiner

*Primary Examiner*—Sheldon J Richter
(74) *Attorney, Agent, or Firm*—Foley & Lardner LLP

(57) ABSTRACT

A first compressor (1*a*) which supercharges intake air is provided in the intake passage (6, 20, 21) of an internal combustion engine (12). The first compressor (1*a*) is driven by the exhaust gas energy of the engine (12). A second compressor (2*a*) driven by an electric motor (2*b*), and a bypass valve (3) which bypasses the second compressor (2*a*), are provided in the intake passage (7, 20, 21) between the first compressor (1*a*) and the engine (12). The bypass valve (3) shifts from the open state to the closed state according to the operation of the second compressor (2*a*). At this time, the bypass valve (3) starts closing at some time after startup of the second compressor (2*a*) so that the intake air amount of the engine (12) is not deficient.

21 Claims, 20 Drawing Sheets

SUPERCHARGER FOR INTERNAL COMBUSTION ENGINE

FIELD OF THE INVENTION

This invention relates to the supercharging of an internal combustion engine.

BACKGROUND OF THE INVENTION

JP2002-021573A published by the Japanese Patent Office in 2002 discloses a turbocharger and an electric supercharger used together for an internal combustion engine for vehicles, in order to obtain a desirable supercharging performance.

The electric supercharger comprised a compressor driven by an electric motor, this compressor and the compressor of the turbocharger being arranged in series in an engine intake passage.

JP2000-230427A published by the Japanese Patent Office in 2000 discloses an electric supercharger in the intake passage of an internal combustion engine, and a bypass valve which bypasses the electric supercharger. The bypass valve is closed when the electric supercharger is operated, i.e., during supercharging, and is opened when the electric supercharger is not operated, i.e., during natural aspiration.

SUMMARY OF THE INVENTION

Due to the fact that the turbocharger drives the compressor using engine exhaust gas energy, a delay referred to as a turbo lag is produced in the supercharging response during engine acceleration. The electric supercharger drives the compressor using electrical energy, so the response is faster than that of the turbocharger, but it cannot be avoided that a certain amount of lag arises due to rotational inertia resistance of rotation components with respect to the timing they start rotation and the timing the rotation speed reaches the required speed for supercharging.

In the period equivalent to this lag when the turbocharger and electric supercharger are connected in series, the electric supercharger conversely becomes a resistance to intake air, lowers the engine intake air amount compared to the natural intake air amount, and interferes with engine acceleration.

As a countermeasure against this drawback, it is possible to provide a bypass valve as disclosed in JP2000-230427A. However, if the opening and closing of the bypass valve is simply interlocked with the operation of the electric supercharger as in JP2000-230427A, as the bypass valve closes simultaneously with startup of the electric supercharger, there is the problem that the intake air amount decreases temporarily due to the resistance to intake air presented by the electric supercharger immediately after startup, i.e., the problem is not resolved. Moreover, as the bypass valve opens simultaneously with the operation stop of the electric supercharger, the intake air supercharged by the electric supercharger escapes from the bypass valve upstream, and the engine intake air amount decreases rapidly. Such a rapid decrease of intake air amount results in undesirable changes to the engine output torque or the air-fuel ratio of the air-fuel mixture supplied to the engine.

It is therefore an object of this invention to optimize the supercharging response of a supercharging device using a turbocharger and an electric supercharger together.

In order to achieve the above object, this invention provides a supercharging device for such an internal combustion engine that comprises an intake passage The device comprises a first compressor installed in the intake passage, a second compressor installed in the intake passage between the first compressor and engine, and a bypass valve which bypasses the second compressor, The first compressor is driven by exhaust gas energy and supercharges intake air in the intake passage. The second compressor is driven by an electric motor and supercharges air discharged from the first compressor; The bypass valve is open when the second compressor is not operating, and starts to close at a certain time after the second compressor starts to operate.

The details as well as other features and advantages of this invention are set forth in the remainder of the specification and are shown in the accompanying drawings.

DESCRIPTION OF THE PREFERRED EMBODIMENTS

Figure 1:
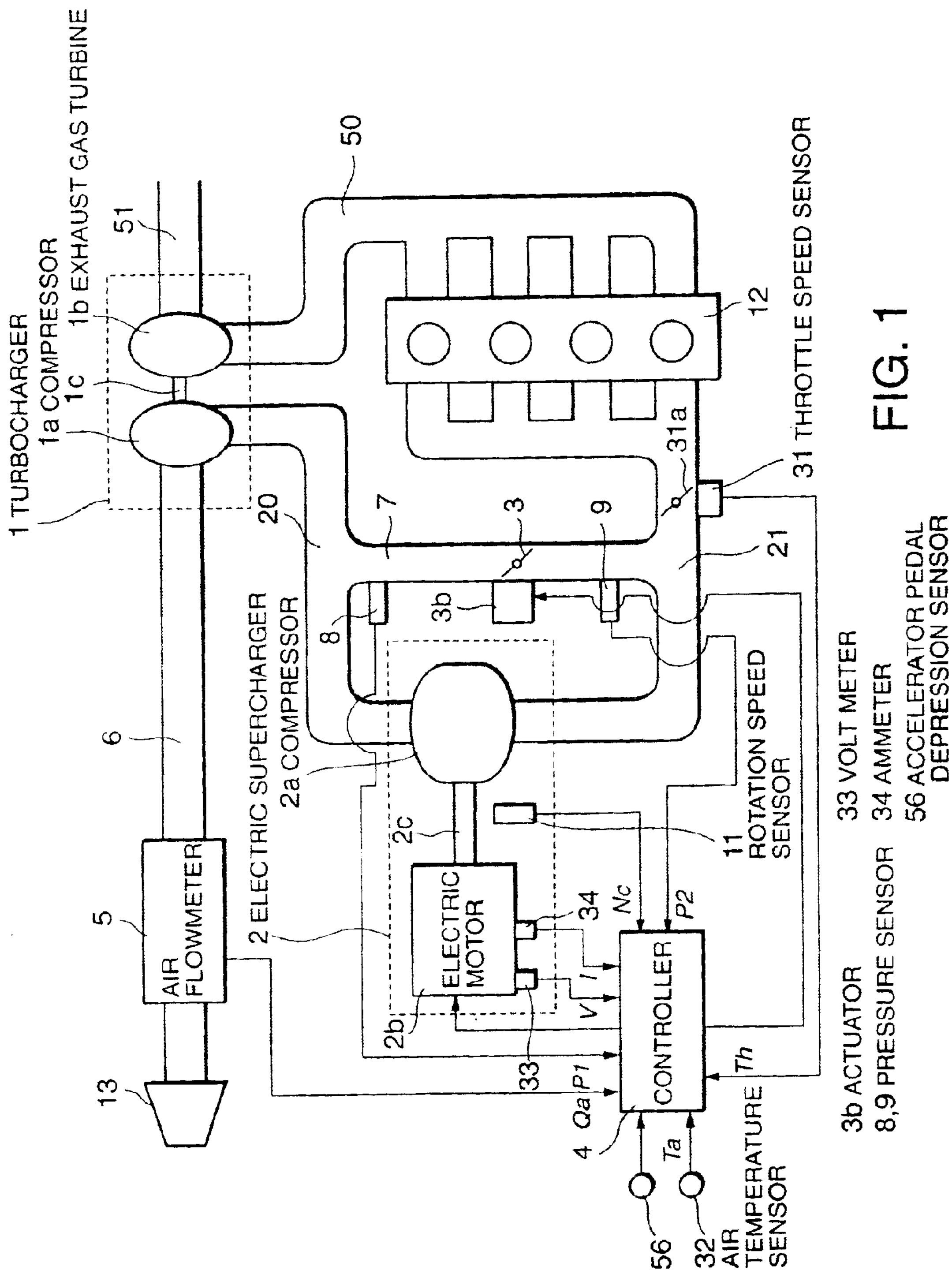
FIG. 1 is a schematic diagram of an internal combustion engine provided with a supercharging device according to this invention.

Referring to FIG. 1 of the drawings, an internal combustion engine 12 for a vehicle internally burns a mixture of fuel and air aspirated from intake passages 6, 20, 21, and rotates due to the combustion energy.

The exhaust gas produced by combustion is discharged from exhaust passages 50, 51.

The intake passages 6 and 20 are connected via a compressor 1*a* of a turbocharger 1.

The exhaust passages 50 and 51 are connected via an exhaust gas turbine 1*b* of the turbocharger 1.

The compressor 1*a* corresponds to a first compressor as defined in the claims.

The exhaust gas turbine 1*b* rotates due to the energy of the exhaust gas which flows from the exhaust passage 50, and rotates together with the compressor 1*a* connected via a shaft 1*c*. The exhaust gas which rotated the exhaust gas turbine 1*b* flows into the exhaust passage 51. The rotating compressor 1*a* aspirates and pressurizes air from the intake passage 6, and discharges it to the intake passage 20.

An air cleaner 13 is provided in the intake passage 6. Intake passages 20, 21 are connected via a compressor 2*a* of the electric supercharger 2, and by a bypass passage 7 which bypasses the compressor 2*a*. The compressor 2*a* corresponds to a second compressor as defined in the claims.

The electric supercharger 2 is provided with an electric motor 2*b* which drives the compressor 2*a* according to a signal from a controller 4, and a shaft 2*c* which transmits the rotation of the electric motor 2*b* to the compressor 2*a*. The compressor 2*a* aspirates and pressurizes the air in the intake passage 20 by rotation of the electric motor 2*b*, and discharges it to the intake passage 21. A throttle 31*a* is provided in the intake passage 21. The throttle 31*a* is interlocked with the depression amount of an accelerator pedal with which the vehicle is provided, and changes the intake cross-sectional area of the intake passage 21.

A bypass valve 3 is provided in the bypass passage 7. The bypass valve 3 is driven by an actuator 3*b*, and opens and closes the bypass passage 7 according to a signal from the controller 4. The controller 4 comprises a microcomputer provided with a central processing unit (CPU), read-only memory (ROM), random access memory (RAM) and I/O interface (I/O interface). It is also possible to form the controller from plural microcomputers.

To control the electric supercharger 2 and bypass valve 3 by the controller 4, an air flowmeter 5 which detects an air flowrate Qa of the intake passage 6, pressure sensor 8 which detects a pressure P1 of the intake passage 20, pressure sensor 9 which detects a pressure P2 of the intake passage 21, rotation speed sensor 11 which detects a rotation speed Nc of the compressor 2*a*, throttle speed sensor 31 which detects an operating speed Th of the throttle 31*a* and air temperature sensor 32 which detects a temperature Ta of the air pressurized by the compressor 2*a*, are provided. The detection data from each of these sensors is inputted into the controller 4 via a signal circuit shown by the thin line arrow of the drawing. The pressure P1 corresponds to a first pressure as defined in the claims, and a pressure P2 corresponds to the second pressure as defined in the claims, respectively.

Next, referring to FIG. 2, the initial supercharging control routine performed by the controller 4 will be described. This routine is performed at an interval of ten milliseconds during operation of the engine 12. Initial supercharging control specifically means control from starting to stopping of the compressor 2*a* of the electric supercharger 2.

Supercharging is performed by the turbocharger 2 during acceleration of the engine 12. This routine aims for supercharging control of the turbo lag period until the boost pressure of the turbocharger 2 reaches the effective pressure from the acceleration requirement.

First, in a step S11, the controller 4 determines whether or not acceleration of the engine 12 is required from a throttle operation speed Th inputted from the throttle speed sensor 31. Specifically, it is determined whether or not the throttle operation speed Th exceeds a predetermined value. Herein, the throttle operation speed Th assumes the speed in the opening direction is a positive value, and assumes the predetermined value is a positive value. A typical value of the predetermined value is 30 degrees per 100 milliseconds. The throttle speed sensor 31 corresponds to a parameter detection sensor relating to the acceleration requirement of the engine 12.

When acceleration is not required in the step S11, after resetting a state flag F to zero in a step S13, the controller 4 terminates the routine. The state flag F is a flag showing whether or not the initial supercharging processing has completed regarding the acceleration requirement of the engine 12, and as long as there is no acceleration requirement, it is always maintained at zero. Moreover, it is set to unity when this processing is completed as described hereafter.

When acceleration is required in the step S11, the controller 4 determines whether or not the state flag F is zero in a step S12. When the state flag F is not zero, the routine is terminated without proceeding to further steps. When the state flag F is zero in the step S12, it means that there is an acceleration requirement and the above processing is not complete. In that case, the controller 4, in a step S14, determines whether the compressor 2*a* is being operated.

When the compressor 2*a* is not being operated, the controller 4, in a step S16, after energizing the electric motor 2*b* and starting operation of the compressor 2*a*, terminates the routine.

When operation of the compressor 2*a* is already being performed, the controller 4, in a step S15, determines whether or not the bypass valve 3 is open.

When the bypass valve 3 is open, the controller 4 determines in a step S17 whether or not a flow Qs of air discharged by the compressor 2*a* of the electric supercharger 2 has reached an air flowrate Qa detected by the air flowmeter 5.

Herein, the air flowrate Qs discharged by the compressor 2*a*, is calculated by the following equation (1) using the rotation speed Nc of the compressor 2*a* detected by the rotation speed sensor 11, the pressure P1 of the intake passage 20 detected by the pressure sensor 8, and the air temperature Ta of the intake passage 20 detected by the temperature sensor 32.

$$Qs = COEF \cdot \frac{Nc \cdot P1}{Ta} \quad (1)$$

where, $COEF$ = conversion factor.

The air flowrate Qs calculated by equation (1) and the air flowrate Qa detected by the air flowmeter 5 are both mass flowrates.

All the intake air of the engine 12 passes the air flow meter 5. Therefore, when the air flowrate Qs discharged by the compressor 2*a* reaches the air flowrate Qa of the air flowmeter 5, it means that all of the intake air passes via the compressor 2*a*, and the flowrate of the bypass valve 3 is substantially zero. Alternatively, it means that the compressor 2*a* has reached the rotation speed which is sufficient to satisfy the supercharging required by the engine 12.

If the determination of the step S17 is affirmative, the controller 4 closes the bypass valve 3 in a step S19 and terminates the routine. If the determination of the step S17 is negative, the controller 4 terminates the routine immediately without proceeding to the step S19.

On the other hand, in the step S15, when the bypass valve 3 is not open, the controller 4, in a step S18, determines whether or not the pressure P1 of the intake passage 20 is more than the pressure P2 of the intake passage 21. When the pressure P1 of the intake passage 21 is less than the pressure P2 of the intake passage 20, the controller 4 terminates the routine immediately.

If the pressure P1 of the intake passage 21 is more than the pressure P2 of the intake passage 20, in a step S20, the controller 4 opens the bypass valve 3, and in a step S21, stops operation of the compressor 2*a*, sets the state flag F to unity in the step S21, and terminates the routine.

According to this routine, when acceleration of the engine 12 is required, as soon as the bypass valve 3 has opened, the compressor 2*a* starts. After this, a change of intake air amount of the engine 12 accompanying closure of the bypass valve 3 can be prevented by keeping the bypass valve 3 open until the flowrate of the bypass valve 3 effectively becomes zero in the step S17, or until the compressor 2*a* reaches the rotation speed required for supercharging.

After closing the bypass valve 3 in the step S19, the controller 4 continues operation of the compressor 2*a* until the pressure P1 of the intake passage 20 reaches the pressure P2 of the intake passage 21. If the pressure P1 of the intake passage 20 becomes more than the pressure P2 in the intake passage 21, it means that the boost pressure of the turbocharger 1 has risen and that supercharging can be performed only by the turbocharger 1.

If this condition is satisfied in the step S18, the controller 4 opens the bypass valve 3, and stops operation of the compressor 2*a*. Also, the state flag F is set to unity which shows completion of initial supercharging processing. The reason why the bypass valve 3 is closed until the pressure P1 of the intake passage 20 becomes more than the pressure P2 of the intake passage 21 in the step S18, is to prevent air flowing backwards from the intake passage 21 to the intake passage 20 via the bypass valve 3.

If the air in the intake passage 21 flows backwards to the intake passage 20, the intake air amount of the engine 12 will decrease and the air-fuel ratio of the fuel-air mixture burnt by the engine 12 or the output torque of the engine 12 will vary. After the pressure P1 of the intake passage 20 reaches the pressure P2 of the intake passage 21, if the bypass valve 3 is opened, the change-over to the turbocharger 1 from the electric supercharger 2 can be performed smoothly without the air supplied to the engine 12 flowing backwards to the intake passage 20, and affecting exhaust gas composition and output torque.

During subsequent acceleration operation of the engine 12, as the determination result of the step S12 becomes negative, essentially none of the processing of this routine is performed, and operation of the engine 12 is performed under supercharging by the turbocharger 1. When acceleration is no longer required, the state flag F is reset to zero in a step S13, and the routine continues resetting the state flag F to zero henceforth at every execution of the routine until an acceleration requirement is detected.

According to this routine, determination of the acceleration requirement of the engine 12 in the step S11 is performed based on the throttle operation speed Th, but it may also be determined based on the throttle opening or accelerator pedal depression amount. For example, the accelerator pedal depression amount is detected by an accelerator pedal depression sensor 56. The depression amount is compared with the predetermined amount and when the depression amount is larger than the predetermined amount at a given engine rotation speed in the step S11, the controller 4 determines that the acceleration of the engine 12 is required. The predetermined amount depends on the engine rotation speed and is set to, for example, 15 degrees at 1200 revolutions per minute (rpm), 20 degrees at 2000 rpm, and 40 degrees at 3000 rpm.

Also according to this routine, the discharge air flowrate Qs of the compressor 2*a* is calculated by the equation (1) in the step S17, but the air flowrate Qs may also be calculated by another method not based on the equation (1).

Figure 3:
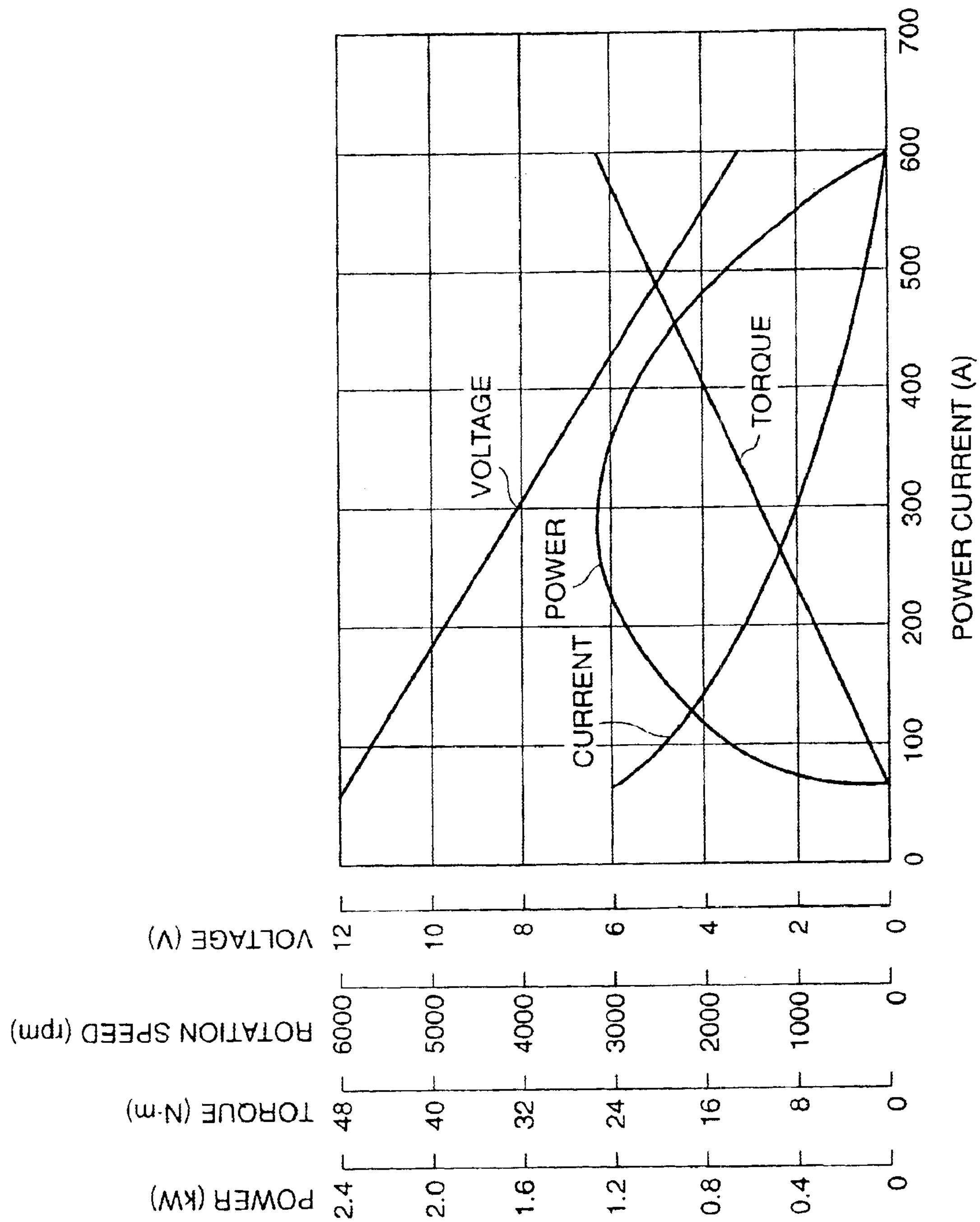
FIG. 3 is a diagram describing the operation characteristics of an electric motor used in the electric supercharger according to this invention.

That is, the voltage and current supplied to the electric motor 2*b* are detected using a voltmeter 33 and an ammeter 34, and the rotation speed of the electric motor 2*b* is calculated from the voltage and current by looking up a map of the characteristics of the electric motor 2*b* shown in FIG. 3 which is prestored in the memory (ROM) of the controller 4.

FIG. 3 shows the relation between the generated torque, rotation speed and generated power of the electric motor 2*b* to the current and voltage supplied to the electric motor 2*b*. As shown in this diagram, when the current becomes large, the generated torque increases but the voltage and rotation speed decrease. The generated power increases with the current to the vicinity of 300 amperes [A], reaches a maximum near 300 amperes [A], and if the current increases more than this, it starts to decrease.

The controller 4 calculates the rotation speed Nc of the compressor 2*a* from the calculated rotation speed of the electric motor 2*b*. In this embodiment, as the electric motor 2*b* and compressor 2*a* are directly connected by the shaft 2*c*, the rotation speed Nc of the compressor 2*a* is equal to the rotation speed of the electric motor 2*b*. The controller 4 further calculates the discharge air flowrate Qs of the compressor 2*a* by the following equation (2) from a discharge flow amount qu per rotation of the compressor 2*a* which is found beforehand from the specification of the compressor 2*a*, and the rotation speed Nc of the compressor 2*a*.

$$Qs=qu\cdot Nc \quad (2)$$

Thus, when calculating the discharge air flowrate Qs of the compressor from the current and voltage supplied to the electric motor 2*a*, the rotation speed sensor 11 and the air temperature sensor 32 can be omitted.

Next, referring to FIGS. 4 and 5, a second embodiment of this invention will be described.

Figure 4:
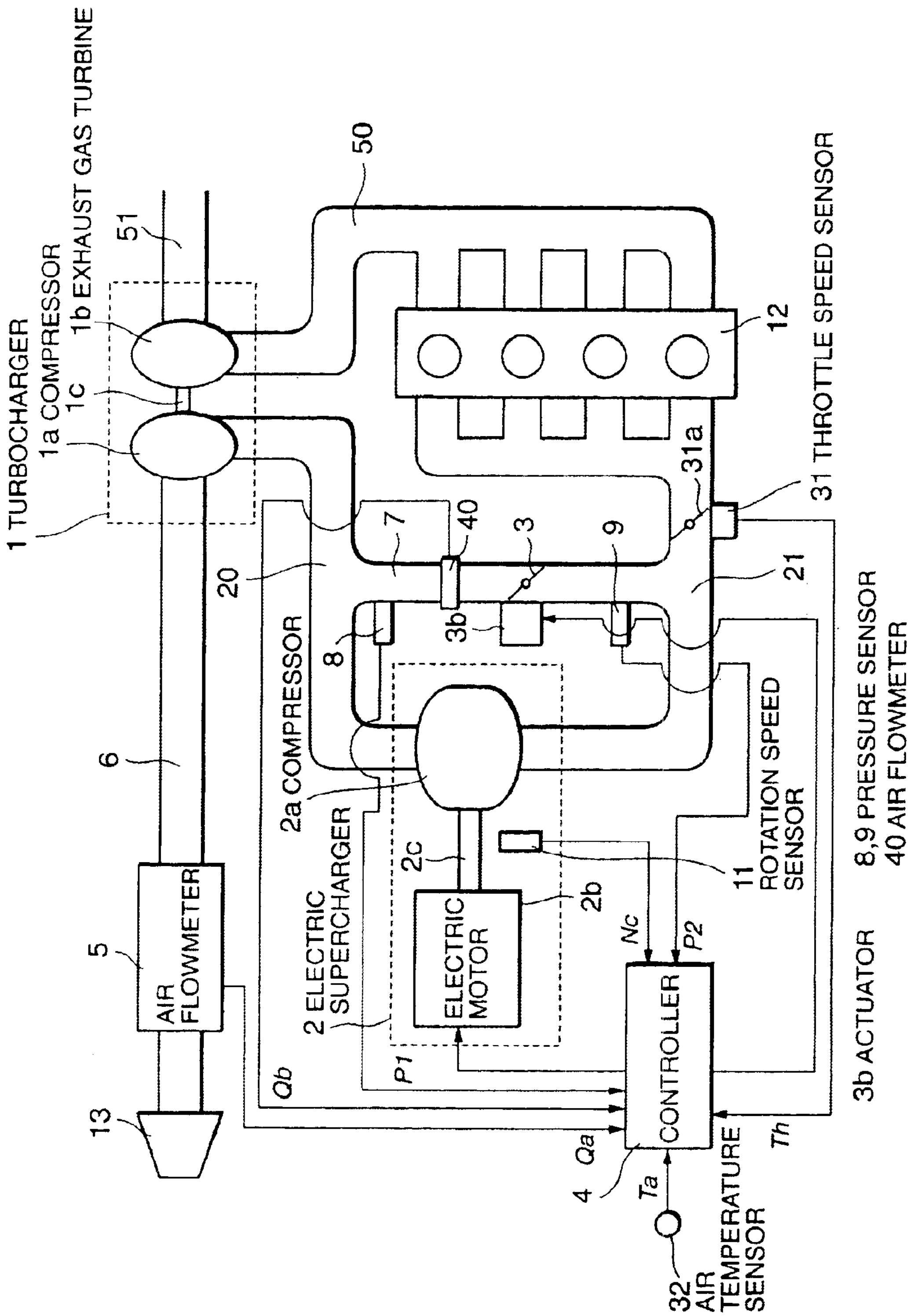
FIG. 4 is similar to FIG. 1, but showing a second embodiment of this invention.

First, referring to FIG. 4, in this embodiment, a second air flowmeter 40 which detects a bypass flowrate Qb is installed upstream of the bypass valve 3 of the bypass passage 7.

Also, the air temperature sensor 32 and the rotation speed sensor 11 of the compressor 2*a* provided in the first embodiment are omitted in this embodiment. The other features of the hardware of the supercharging device are identical to those of the first embodiment.

Figure 2:
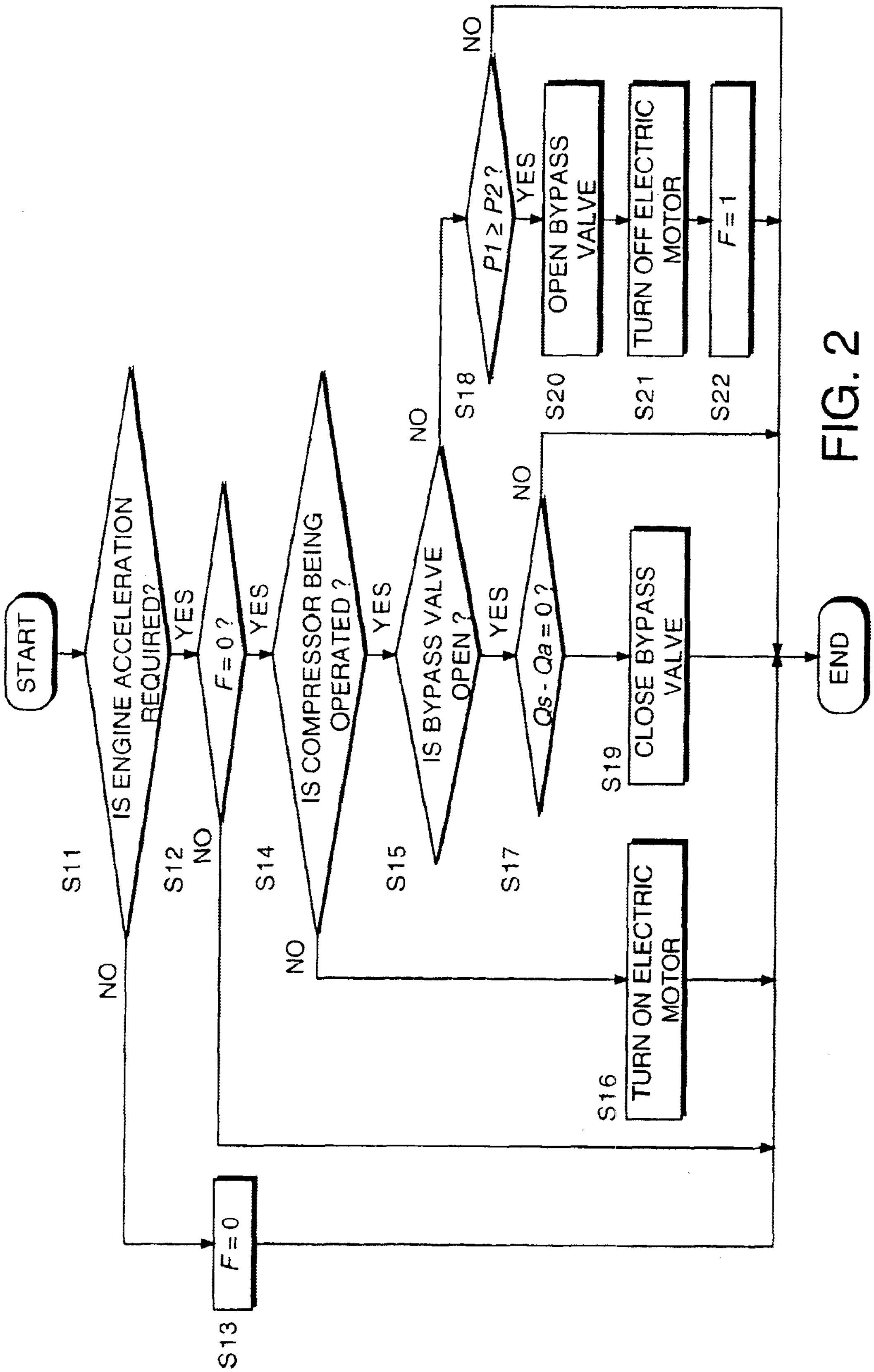
FIG. 2 is a flowchart describing an initial supercharging control routine performed by the controller of this invention.

In the first embodiment, when the flowrate Qs of the compressor 2*a* is calculated using equation (1) from the rotation speed Nc of the compressor 2*a*, the pressure P1 of the intake passage 20 and the intake air temperature Ta in the step S17 of FIG. 2, and the flowrate Qs becomes equal to the intake air flowrate Qa detected by the air flowmeter 5, in a step S19, the bypass valve 3 is closed.

Figure 5:
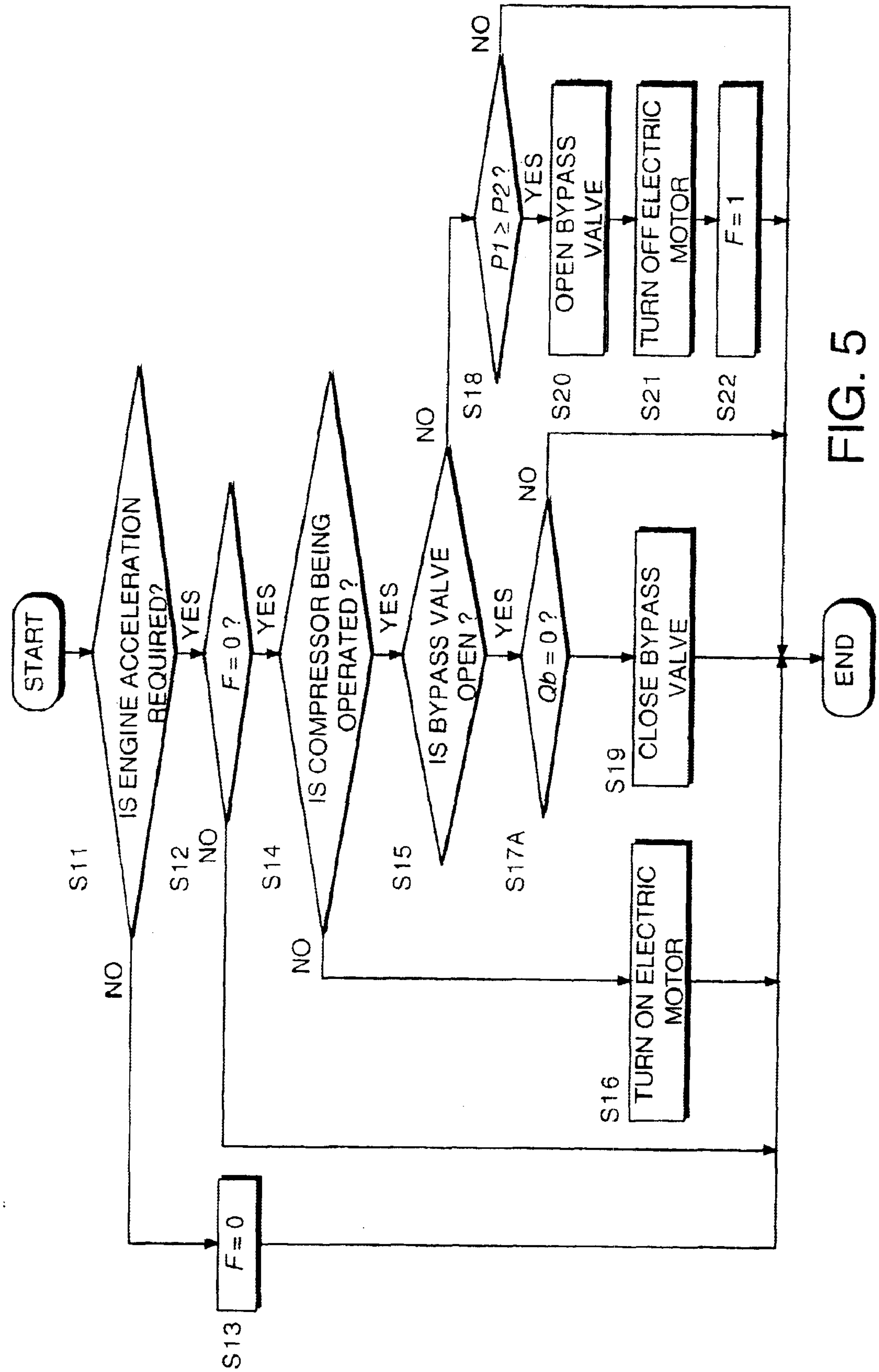
FIG. 5 is similar to FIG. 2, but showing the second embodiment of this invention.

On the other hand, in this embodiment, the initial supercharging control routine shown in FIG. 5 is performed instead of the initial supercharging control routine of FIG. 2.

In the routine of FIG. 5, a step S17A is provided instead of the step S17 of FIG. 2.

In the step S17A, the controller 4 determines whether or not the bypass flowrate Qb is zero. When the bypass flowrate Qb is zero, in a step S19, the controller 4 closes the bypass valve 3. When the bypass flowrate Qb is not zero, the processing of steps S18–S22 is performed. The processing other than that of the step S17A is identical to that of the routine of FIG. 2.

According to this embodiment, the bypass valve 3 is closed after the bypass flowrate Qb becomes zero after starting the compressor 2*a*, so even if the bypass valve 3 is closed, the intake air amount of the engine 12 does not change, and reduction of the intake air amount of the engine 12 accompanying closure of the bypass valve 3 can be prevented as in the first embodiment.

The effects of the above embodiments are as follows.

(1) In the state where exhaust gas pressure is low as in the low rotation speed region of the engine 12 and the turbocharger 1 cannot perform supercharging sufficiently, the lack of supercharging performance of the turbocharger 1 can be compensated by the electric supercharger 2. As the bypass valve 3 is opened after the turbocharger 1 is in the state where supercharging can be sufficiently performed, the air which subsequently moves from the intake passage 20 to the intake passage 21 passes not via the compressor 2*a* in the stop state but along the bypass passage 7 which has less resistance. Therefore, the compressor 2*a* does not lead to a pressure loss of supercharging by the turbocharger 1.

(2) The bypass valve 3 is always opened when the compressor 2*a* starts, and air moves from the intake passage 20 to the intake passage 21 via both the compressor 2*a* and the bypass passage 7. Therefore, even if the compressor 2*a* is in the state where the rotation speed is low immediately after starting, it does not present a resistance to aspiration by the engine 12. As a result, there is no temporary reduction of the intake air amount of the engine 12 accompanying the starting of the compressor 2*a*.

(3) As the bypass valve 3 is closed when the flowrate of the bypass valve 3 is effectively zero, the closure of the bypass valve 3 does not cause a change in the intake air amount of the engine 12.

(4) As the bypass valve 3 is opened when the pressure P1 of the intake passage 20 and the pressure P2 of the intake passage 21 become equal, even if the bypass valve 3 is opened, air does not flow backwards in the bypass passage 7. In other words, the opening of the bypass valve 3 does not cause a change of the intake air amount of the engine 12.

Hence, as the effect of opening and closing of the bypass valve 3 in the early stages of supercharging on the intake air amount of the engine 12 is eliminated, after supercharging starts, the intake air amount of the engine 12 increases smoothly and with a good response, and a satisfactory accelerating performance is obtained. Also, as the intake air amount of the engine 12 does not change suddenly, a change of the air-fuel ratio of the fuel-air mixture which is burnt and a change of output torque can also be prevented.

In all the above embodiments, the closure of the bypass valve 3 was delayed until the flowrate of the bypass valve 3 became zero after starting the compressor 2*a*, but a similar effect can be obtained by delaying closure of the bypass valve 3 to a certain time after starting operation of the compressor 2*a*, e.g., opening the bypass valve 3 at a predetermined time from the starting of the compressor 2*a*, or opening the bypass valve 3 when the rotation speed Nc of the compressor 2*a* reaches a predetermined speed.

Although the above embodiments relate to a supercharging device provided with the compressor 1*a* upstream of the compressor 1*a*, this invention can be applied also to a supercharging device comprising only the compressor 2*a* and bypass valve 3 as in the above prior art example JP2000-230427A. Moreover, it is not limited to cases where the drive force of the compressor 2*a* is the electric motor 2*b*, and can be applied to various rotary drive devices including an exhaust gas turbine.

Figure 6:
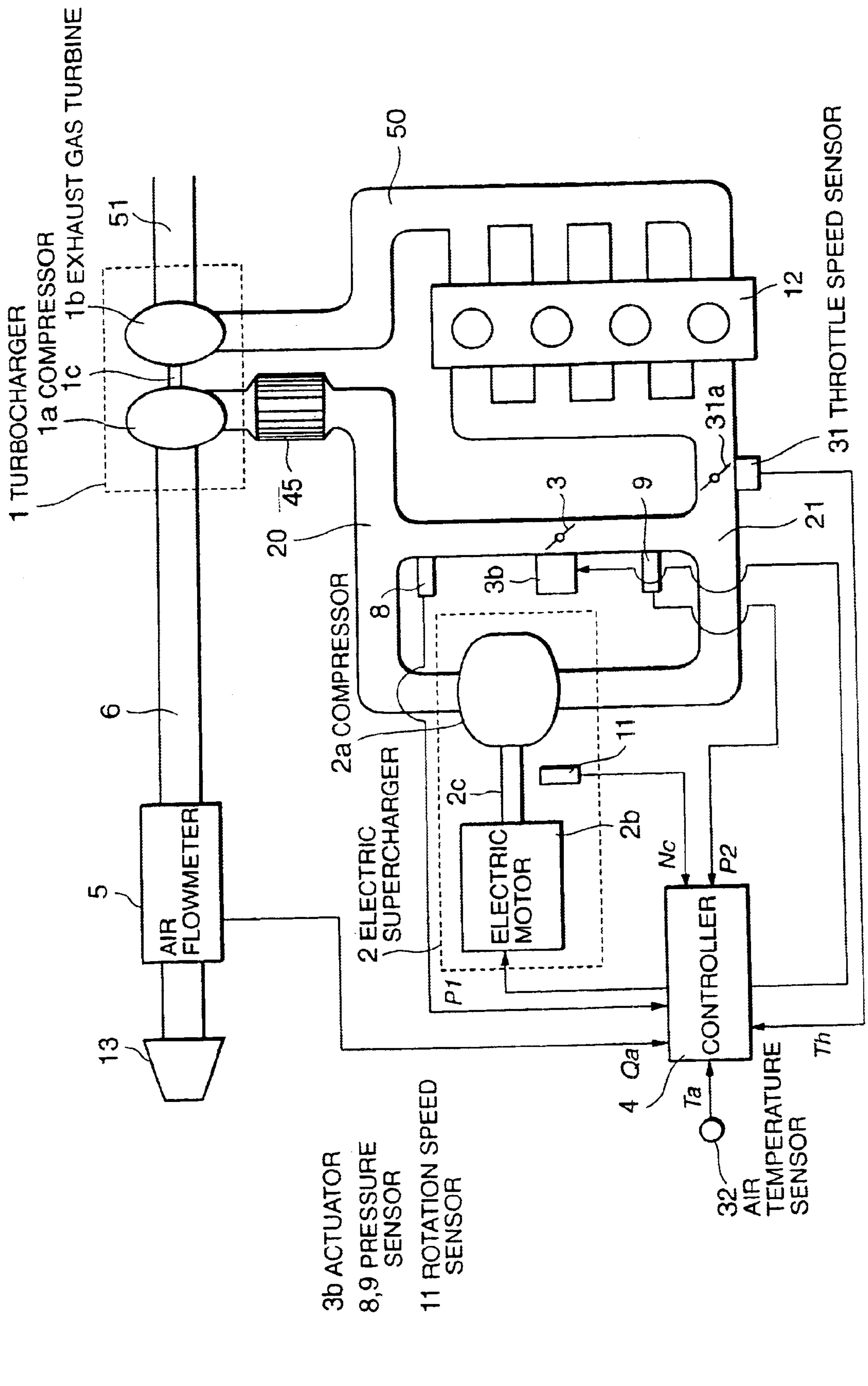
FIG. 6 is a schematic diagram of an internal combustion engine provided with a supercharging device according to a third embodiment of this invention.

Next, referring to FIG. 6, a third embodiment of this invention will be described.

The supercharging device according to this embodiment is provided with an intercooler 45 between a branch point with the bypass passage 7 of the intake passage 20, and the compressor 1*a* of the turbocharger 1. The remaining features of the construction are identical to those of the supercharging device according to the first or second embodiments. Due to the intercooler 45, air compressed by the compressor 1*a* which is at a high temperature, is cooled. As a result, as the heat amount transmitted to the electric motor 2*b* via the shaft 2*c* from the compressor 2*a* becomes small, the operating efficiency of the electric motor 2*b* improves, and the acceleration performance of the supercharging device improves. Also, as the temperature rise of the electric motor 2*b* is controlled, if the boost pressure of the turbocharger 1 does not rise for example when climbing a mountain road, supercharging by the compressor 2*a* can be performed over a long period.

Figure 7:
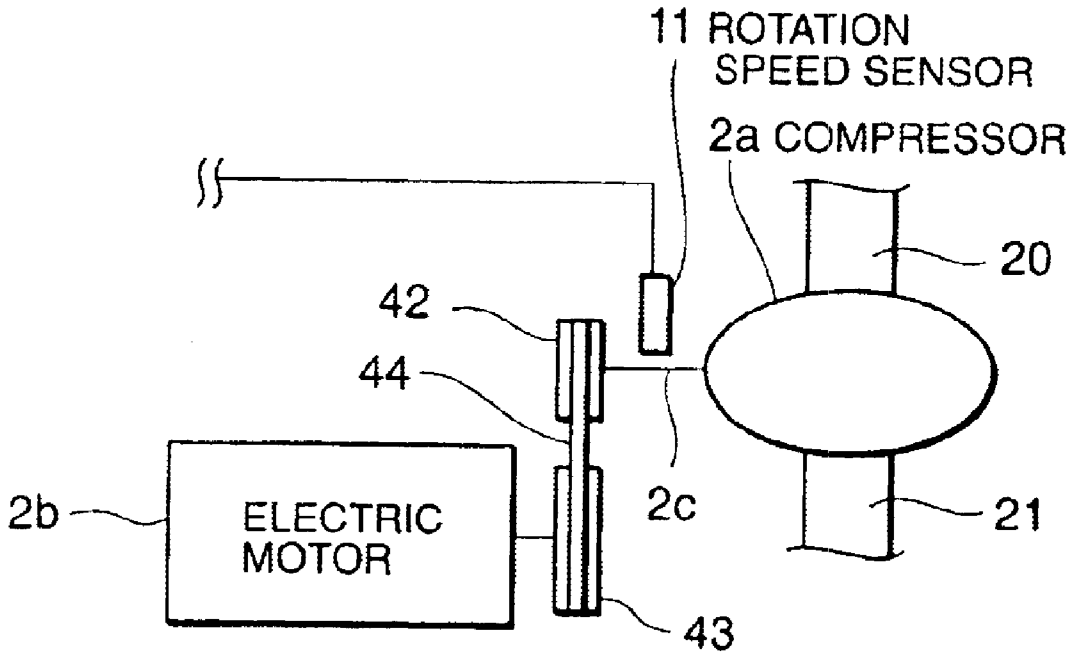
FIG. 7 is a schematic diagram of an electric supercharger according to a fourth embodiment of this invention.

Next, referring to FIG. 7, a fourth embodiment of this invention will be described.

The electric supercharger 2 according to this embodiment connects the compressor 2*a* and electric motor 2*b* via pulleys 42, 43 and a belt 44 instead of directly connecting via the shaft 2*c*. The pulley 42 is connected to the compressor 2*a*, and the pulley 43 is connected to the electric motor 2*b*, respectively, and the belt 44 is looped around the pulleys 42 and 43. The remaining features of the construction are identical to those of the third embodiment.

Due to this construction, the amount of heat transfer from the compressor 2*a* to the electric motor 2*b* can be further reduced. Also, by setting the outer diameter of the pulley 43 to be larger than the outer diameter of the pulley 42, the rotation of the electric motor 2*b* can be accelerated and transmitted to the compressor 2a, and the boost pressure of the compressor 2a can be increased.

Next, referring to FIG. 8, a fifth embodiment of this invention will be described.

In this embodiment, a first intercooler 45 is provided between the branch point with the bypass passage 7 of the intake passage 20, and the compressor 2a, and a second intercooler 46 is provided between the branch point of the bypass passage 7 of the intake passage 21, and the engine 12. The remaining hardware is identical to that of the first embodiment.

In this embodiment, the air aspirated by the compressor 2b is cooled by the first intercooler 45 as in the third embodiment. As a result, as the heat amount transmitted to the electric motor 2b via the shaft 2c from the compressor 2a becomes small, the operating efficiency of the electric motor 2b improves, and the acceleration performance of the supercharging device improves. Also, as the temperature rise of the electric motor 2b is controlled, if the boost pressure of the turbocharger 1 does not rise for example when climbing a mountain road, supercharging can be performed by the compressor 2a over a long time period. Also, as the second intercooler 46 cools both the air discharged from the compressor 2a and the air from the bypass passage 7, and supplies the engine 12, the intake air temperature of the engine 12 is always maintained within a desirable range.

Figure 9:
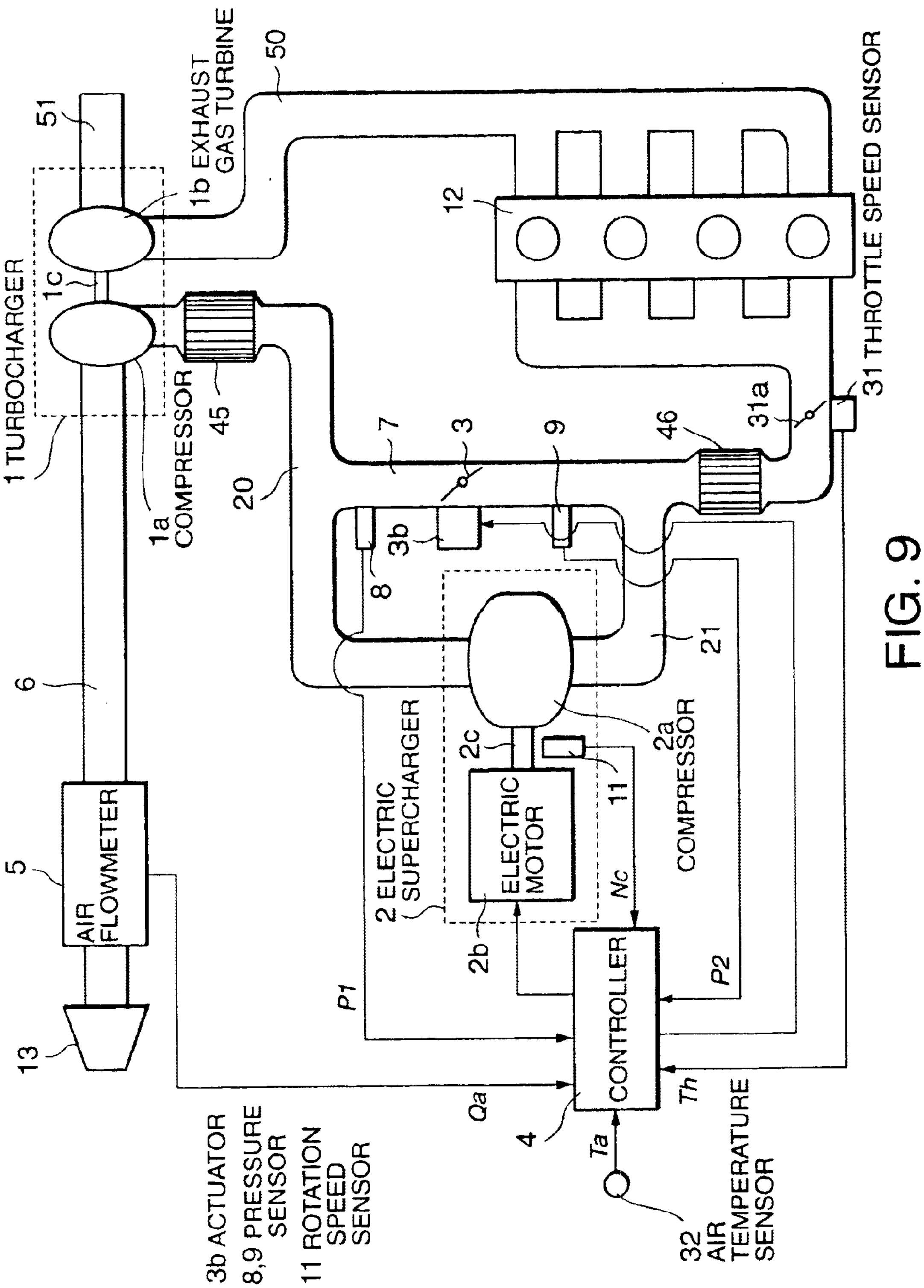
FIG. 9 is a schematic diagram of an internal combustion engine provided with a supercharging device according to a sixth embodiment of this invention.

Next, a sixth embodiment of this invention will be described referring to FIG. 9.

In this embodiment. the first intercooler 45 is disposed between the branch point of the bypass passage 7 of the intake passage, and the compressor 1a of the turbocharger 1. The remaining features of the composition are identical to those of the fifth embodiment.

According to this embodiment, the air discharged from the compressor 1a passes through the two intercoolers 45 and 46 irrespective of the operation of the compressor 2a.

In the high load operating region of the engine 12, when the boost pressure due to the compressor 1a is increased, the compressor 2a stops operation and all air is supplied to the engine 12 from the bypass passage 7. According to this embodiment, cooling of intake air is performed also in this state by the two intercoolers 45 and 46, so cooling efficiency is higher than in the fifth embodiment, and it is possible to make the capacity of the intercooler 46 small.

Next, referring to FIGS. 10–12, FIGS. 13A–13E and FIGS. 14–16, a seventh embodiment of this invention will be described.

In each of above mentioned embodiments, as shown for example in the Steps S17, S19 of the first embodiment, the bypass valve 3 is closed when the flowrate of the bypass valve 3 is effectively zero. In this case, a closure signal is outputted to the actuator 3b from the controller 4, and it takes some time for the bypass valve 3 to rotate from a fully open position to a fully closed position. This required time introduced a delay into the control of the bypass valve 3. Consequently, as the rotation speed of the electric motor 2b rises during this delay, part of the air discharged from the compressor 2a flows backwards to the intake passage 20 via the bypass valve 3 before it has been closed. As a result, when the bypass valve 3 has completely closed, the intake air volume of the engine 12 rapidly increases, and a stepwise difference may appear in the output torque.

The main feature of this embodiment is that the rotation speed variation of the electric motor 2b is predicted, and a closure signal is output to the actuator 3b based on the predicted rotation speed so that a stepwise difference does not arise in the output torque of the engine 12 due to closure of the bypass valve 3.

Figure 10:
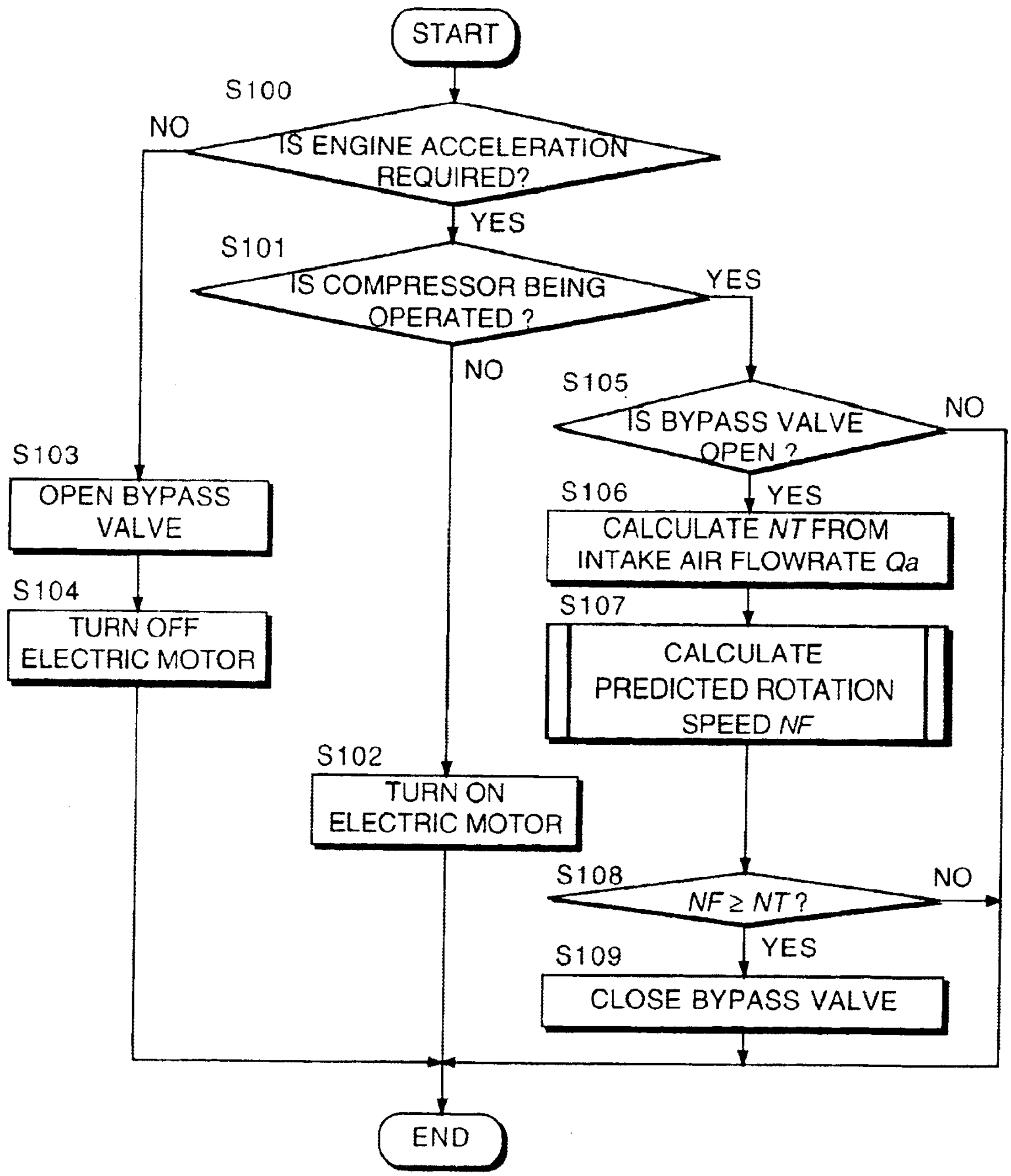
FIG. 10 is a flowchart describing an initial supercharging control routine performed by a controller according to a seventh embodiment of this invention.

The construction of the hardware of this embodiment is identical to that of the first embodiment, but the controller 4 performs the initial supercharging processing routine shown in FIG. 10 instead of the initial supercharging processing routine of FIG. 2.

This routine is also performed at an interval of ten milliseconds during operation of the engine 12.

Referring to FIG. 10, first in a step S100, the controller 4 determines whether or not acceleration of the engine 12 is required.

This determination is identical to the determination of the step S11 of FIG. 2.

As operation of the compressor 2a is unnecessary when acceleration of the engine 12 is not required, the controller 4 opens the bypass valve 3 in a step S103, stops operation of the compressor 2a in a step S104, and terminates the routine.

The processing of the Steps S103 and S104 is equivalent to the processing of the Steps S20 and S21 of FIG. 2.

When acceleration of the engine 12 is required in the step S100, the controller 4 determines whether or not the compressor 2a is being operated in a step S101.

This determination is identical to the determination of the step S14 of FIG. 2.

When the compressor 2a is not being operated, in a step S102, the controller 4 energizes the electric motor 2b to start the compressor 2a, and terminates the routine.

This processing is identical to the processing of the step S16 of FIG. 2.

If the compressor 2a is already operating, the controller 4 determines, in a step S105, whether or not the bypass valve 3 is open. This determination is identical to the determination of the step S15 of FIG. 2.

When the bypass valve 3 is open, in a step S106, a target rotation speed NT of the compressor 2a is calculated from the air flowrate Qa detected by the air flowmeter 5.

Herein, it is preferable that the bypass valve 3 completes the closing operation at the timing where all the intake air of the engine 12 has been supplied from the compressor 2a, or the intake air flowrate Qa has become equal to the discharge flowrate Qs of the compressor 2a. The relation of the rotation speed Nc of the compressor 2a and the discharge flowrate Qs may be roughly expressed by the following equation (3):

$$Qs=COEFA.Nc \quad (3)$$

where, COEFA=conversion factor.

Herein, the rotation speed Nc of the compressor 2a when the discharge flowrate Qs of the compressor 2a is equal to the intake air volume Qa of the engine 12, is the target rotation speed NT.

If the above delay in the closure of the bypass valve 3 is represented by a delay time T and a closure signal is outputted to the actuator 3b of the bypass valve 3 at a time obtained by deducting the delay time T from the time when the rotation speed of the compressor 2a reaches the target rotation speed NT, closure of the bypass valve 3 will be completed when the intake air flowrate Qa becomes equal to the discharge flowrate Qs.

Figure 11:
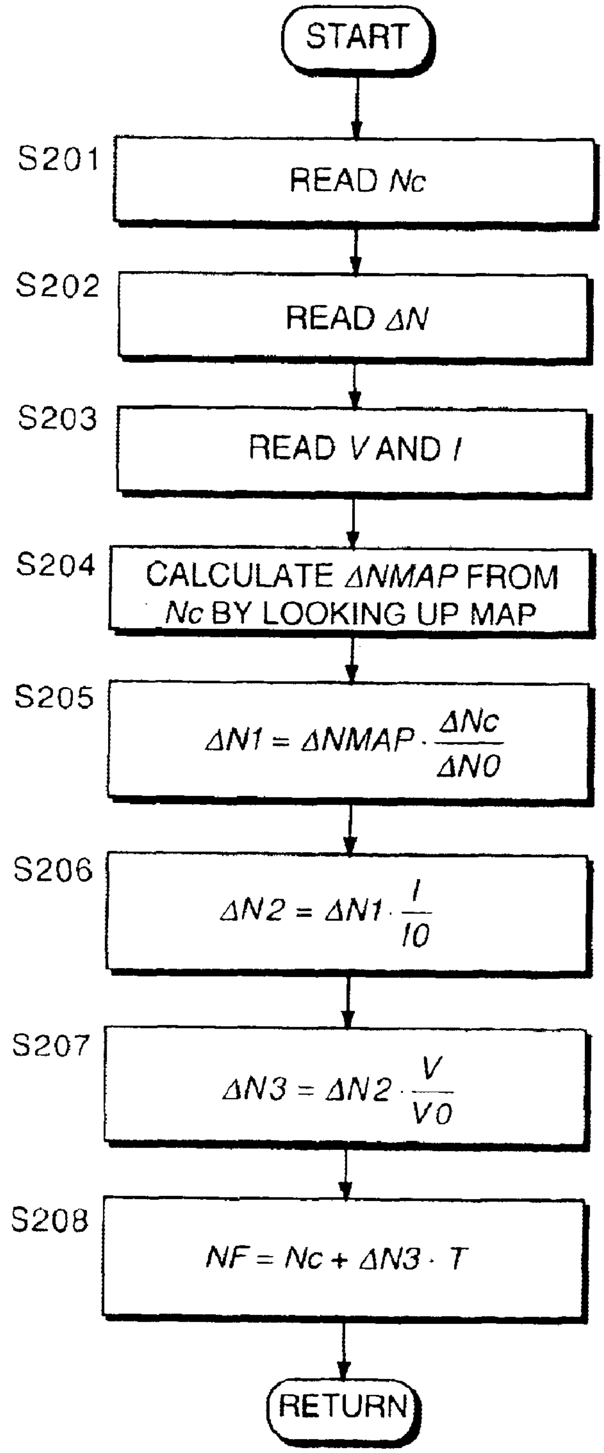
FIG. 11 is a flowchart describing a subroutine for calculating a predicted rotation speed NF performed by the controller according to the seventh embodiment of this invention.

After calculating the target rotation speed NT in the step S106, the controller 4, in a step S107, calculates the predicted rotation speed NF of the compressor 2a after the delay time T has elapsed from the present time by performing the subroutine shown in FIG. 11.

Referring to FIG. 11, in a step S201, the controller 4 reads the rotation speed Nc of the compressor 2a detected by the rotation speed sensor 11.

In a following step S202, the controller 4 calculates the difference of the rotation speed Nc of the compressor 2*a*, and a rotation speed $Nc_{n-1}$ of the compressor 2*a* read on the immediately preceding occasion when the subroutine was executed as an increase rate ΔNc of the rotation speed of the compressor 2*a*.

In a following step S203, the controller 4 reads a detection voltage V of a voltmeter 33, and a detection current I of an ammeter 34.

Figure 12:
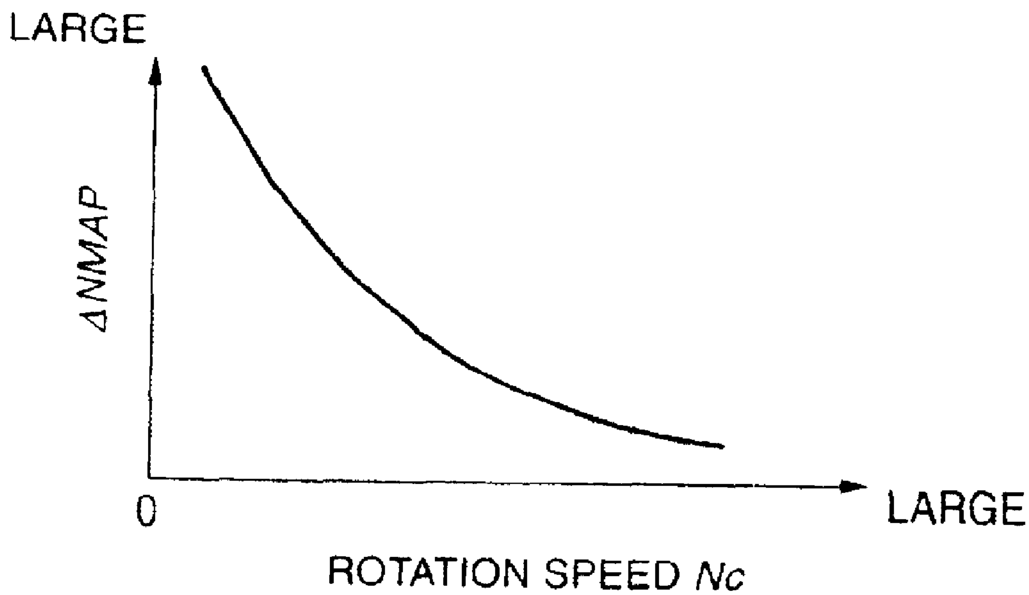
FIG. 12 is a diagram describing the characteristics of a map of a rotation increase rate estimation value ΔNMAP stored by the controller according to the seventh embodiment of this invention.

In a following step S204, the controller 4 calculates a rotation increase rate prediction value ΔNMAP during the delay time T from the rotation speed Nc of the compressor 2*a* by looking up a map having the characteristics shown in FIG. 12 which is prestored in a memory (ROM).

In this map, the rotation increase rate prediction value ΔNMAP becomes smaller as the rotation speed Nc of the compressor 2*a* increases, as shown in FIG. 12. As the output torque of the electric motor 2*b* which drives the compressor 2*a* falls according to the rise of rotation speed, the rotation increase rate per unit time becomes smaller with increasing rotation speed, as shown in FIG. 3.

This is why, in FIG. 12, the rotation increase rate prediction value ΔNMAP becomes smaller as the rotation speed Nc increases.

In a following step S205, the controller 4 corrects the rotation increase rate prediction value ΔNMAP by the following equation (4) using a real rotation increase rate ΔNc. This correction corrects for the change of the rotation increase rate of the electric motor 2*b* due to the effect of the load fluctuation of the electric motor 2*b*, or the time-dependent variation in the performance of the electric motor 2*b*.

The rotation increase rate prediction value after compensation is taken as ΔN1.

$$\Delta N1 = \Delta NMAP \cdot \frac{\Delta Nc}{\Delta N0} \tag{4}$$

where, $\Delta N0$ = reference rotation increase rate.

Figure 14:
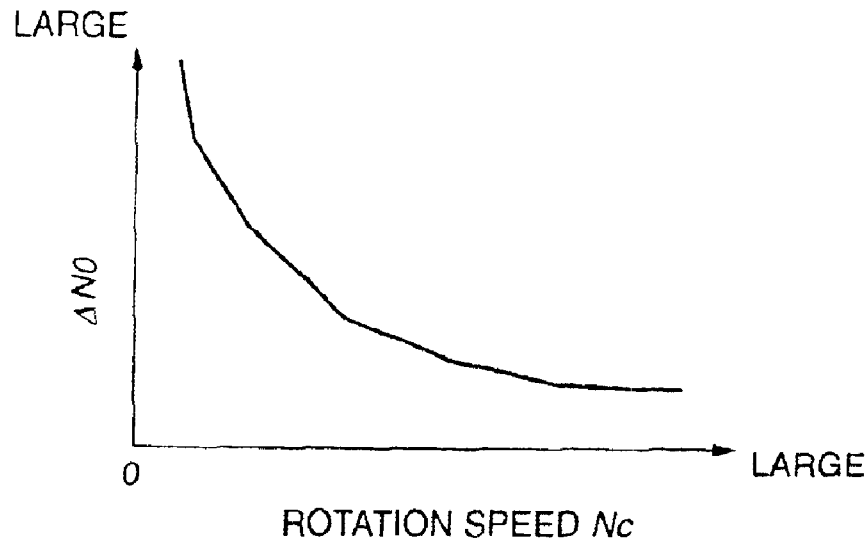
FIG. 14 is a diagram describing the characteristics of a map of a reference rotation increase rate estimation value ΔN0 stored by the controller according to the seventh embodiment of this invention.

The controller 4 performs the calculation of equation (4) after calculating the reference rotation increase rate ΔN0 from the rotation speed Nc of the compressor 2*a* by looking up a map having the characteristics shown in FIG. 14 which is prestored in an internal memory (ROM). This map is set so that the reference rotation increase rate ΔN0 decreases as the rotation speed Nc increases.

In a following step S206, the controller 4 further corrects the rotation increase rate prediction value ΔN1 by the following equation (5) based on the current I supplied to the electric motor 2*b*.

This correction corrects for the variation of the rotation increase rate of the electric motor 2*b* according to the current I. The rotation increase rate prediction value after compensation is taken as ΔN2.

$$\Delta N2 = \Delta N1 \cdot \frac{1}{10} \tag{5}$$

where, 10 = reference current value.

Figure 15:
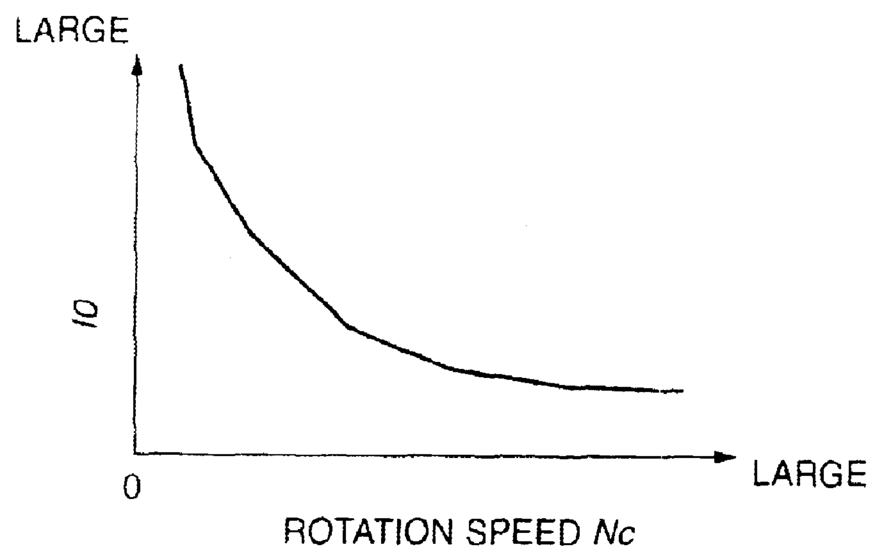
FIG. 15 is a diagram describing the characteristics of a map of a reference current value I0 stored by the controller according to the seventh embodiment of this invention.

The controller 4 performs the calculation of equation (5) after calculating the reference current value I0 from the rotation speed Nc of the compressor 2*a* by looking up a map having the characteristics shown in FIG. 15 stored beforehand in the internal memory (ROM). This map is set so that the reference current value I0 decreases as the rotation speed Nc increases.

In a following step S207, the controller 4 also corrects the rotation increase rate prediction value ΔN2 by the following equation (6) based on the voltage V supplied to the electric motor 2*b*. This corrects the variation of the rotation increase rate prediction value of the electric motor 2*b* according to the voltage V.

The rotation increase rate prediction value after correction is set to ΔN3.

$$\Delta N3 = \Delta N2 \cdot \frac{V}{V0} \tag{6}$$

where, $V0$ = reference voltage value.

Figure 16:
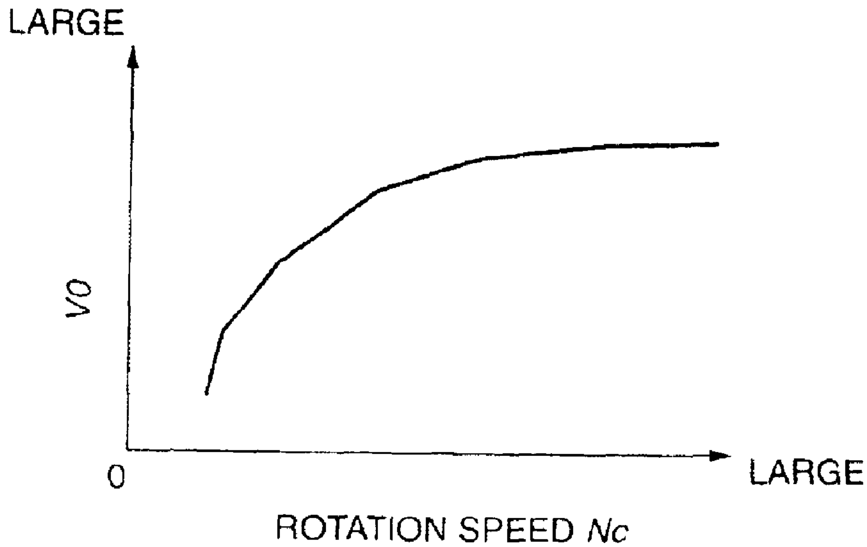
FIG. 16 is a diagram describing the characteristics of a map of a reference voltage value V0 stored by the controller according to the seventh embodiment of this invention.

The controller 4 performs the calculation of equation (6) after calculating the reference voltage value V0 from the rotation speed Nc of the compressor 2*a* by looking up a map having the characteristics shown in FIG. 16 stored beforehand in the internal memory (ROM). This map is set so that the reference voltage value V0 increases as the rotation speed Nc increases.

It is not absolutely necessary to perform all the corrections of the steps S205–S207, and a setting which performs only one or two of the corrections of the steps S205–S207, or a setting which does not perform correction, are also possible.

In a following step S208, the predicted rotation speed NF after the delay time T passes is calculated by the following equation (7) using the rotation increase rate prediction value ΔN3.

$$NF = Nc + \Delta N3 \cdot T \tag{7}$$

After the processing of the step S208, the controller 4 terminates the subroutine.

Referring again to FIG. 10, after calculating the predicted rotation speed NF in the step S107, the controller 4, in a step S108, determines whether or not the predicted rotation speed NF has reached the target rotation speed NT. When the predicted rotation speed NF has reached the target rotation speed NT, the controller 4 closes the bypass valve 3 in a step S109, and terminates the routine. When the predicted rotation speed NF has not reached the target rotation speed NT, the controller 4 terminates the routine without performing the processing of the step S109.

The change of the rotation speed Nc of the compressor 2*a* and the change in the opening of the bypass valve 3 due to the execution of this routine will now be described referring to FIGS. 13A–13E.

Figures 13A, 13B, 13C, 13D, 13E:
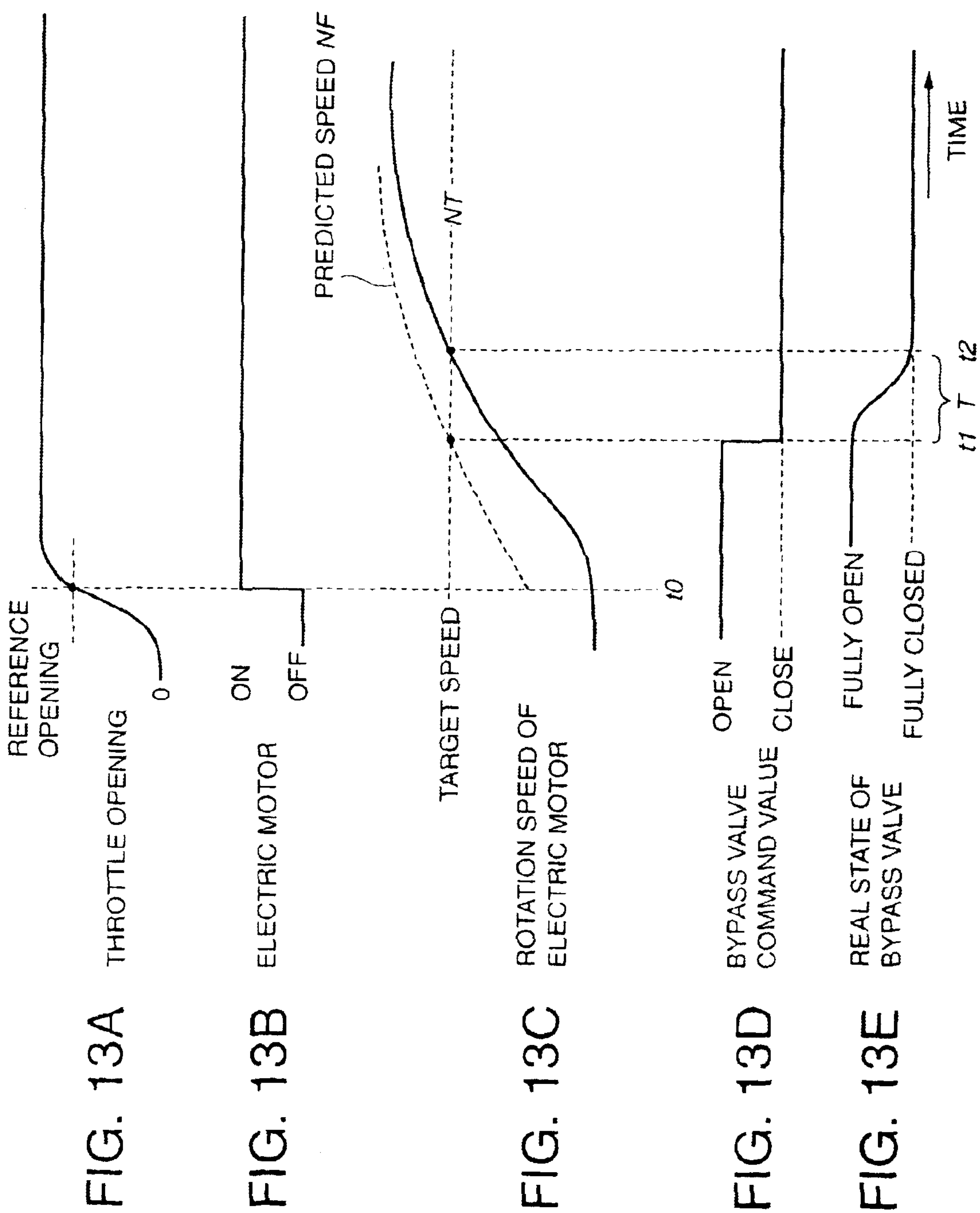
FIGS. 13A–13E are timing charts describing the starting of an electric motor and the closure timing of a bypass valve according to the seventh embodiment of this invention.

First, as shown in FIG. 13A, if an acceleration requirement is detected in the step S100 at a time t0, the controller 4, as shown in FIG. 13B, immediately switches on power to the electric motor 2*b*, and starts operation of the compressor 2*a*.

As a result, as shown in FIG. 13C, the rotation speed Nc of the compressor 2*a* rises, and the predicted rotation speed NF reaches the target rotation speed NT at a time t1.

At this point, as shown in FIG. 13D, the controller 4 outputs a closure signal to the actuator 3*b* of the bypass valve 3. As a result, the bypass valve 3 rotates in the closure direction, and at a time t2 when the delay time T has elapsed since the time t1, the rotation speed Nc of the compressor 2*a* reaches the target rotation speed NT, and closure of the bypass valve 3 is completed simultaneously.

Thus, since closure of the bypass valve 3 is completed in synchronism with the attainment of the target rotation speed NT by the compressor 2*a*, the air discharged by the compressor 2*a* does not flow backwards from the bypass valve 3 to the intake passage 20. Therefore, closure of the bypass valve 3 does not lead to a change in the intake air flowrate of the engine 12, and the output torque of the engine 12 does not vary in stepwise fashion.

Next, referring to FIG. 17, an eighth embodiment of this invention will be described.

Figure 8:
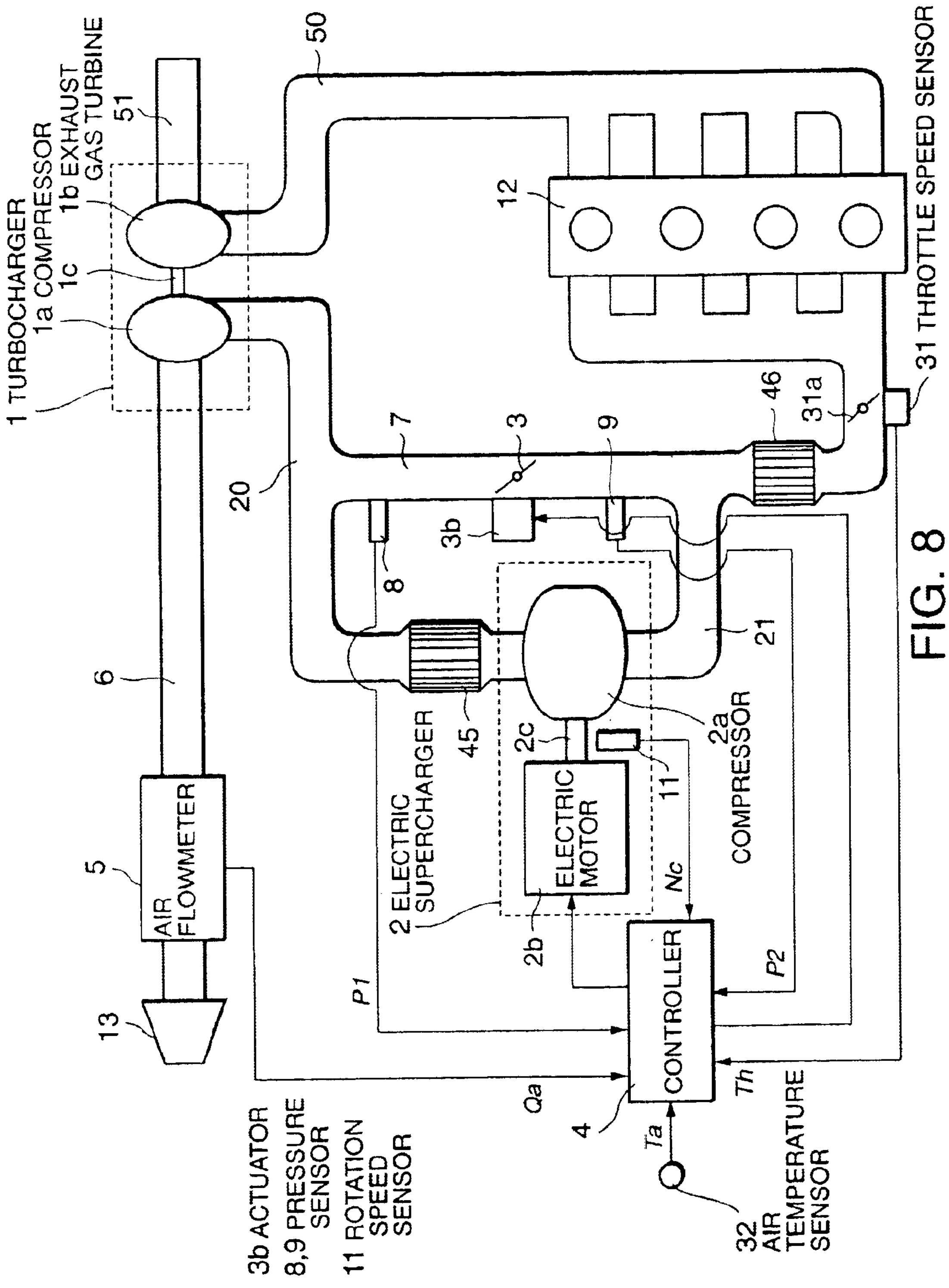
FIG. 8 is a schematic diagram of an internal combustion engine provided with a supercharging device according to a fifth embodiment of this invention.

This embodiment is an embodiment relating to a method of calculating the predicted rotation speed NF by the controller 4 in the step S107 of FIG. 8.

The construction of the hardware of the supercharging device is identical to that of the supercharging device according to the seventh embodiment.

Figure 17:
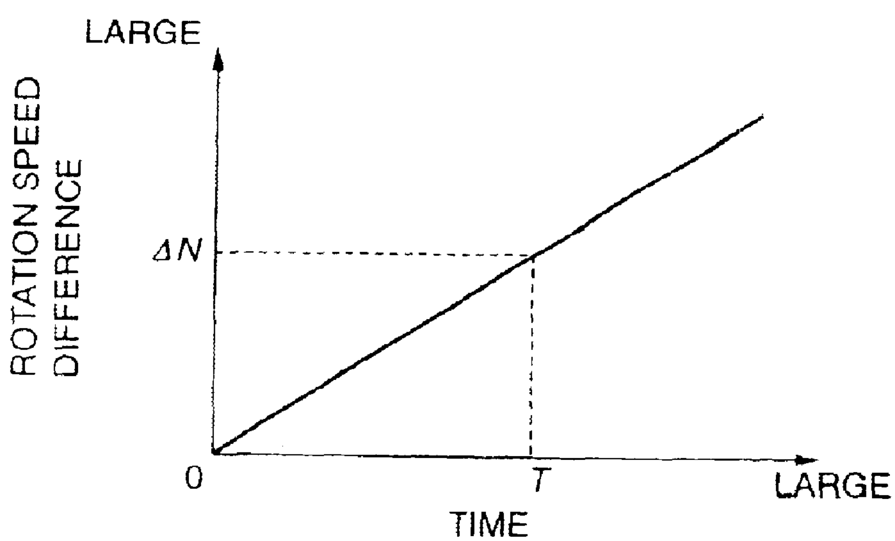
FIG. 17 is a diagram describing the characteristics of a rotation speed difference ΔN set by a controller according to an eighth embodiment of this invention.

In this embodiment, as shown in FIG. 17, it is considered that the rotation speed increase rate of the compressor 2*a* is fixed. According to this diagram, the rotation speed difference ΔN can be calculated from the delay time T. The delay time T can be found beforehand by experiment. Therefore, the rotation speed difference ΔN is given as a fixed value. The controller 4 according to this embodiment, in the step S107, calculates the predicted rotation speed NF by adding the rotation speed difference ΔN to the initial value N0 of the rotation speed when the compressor 2*a* is started.

According to this embodiment, the same effect as that of the seventh embodiment can be obtained by means of a simple construction.

Next, referring to FIGS. 18–21, a ninth embodiment of this invention will be described.

Figure 18:
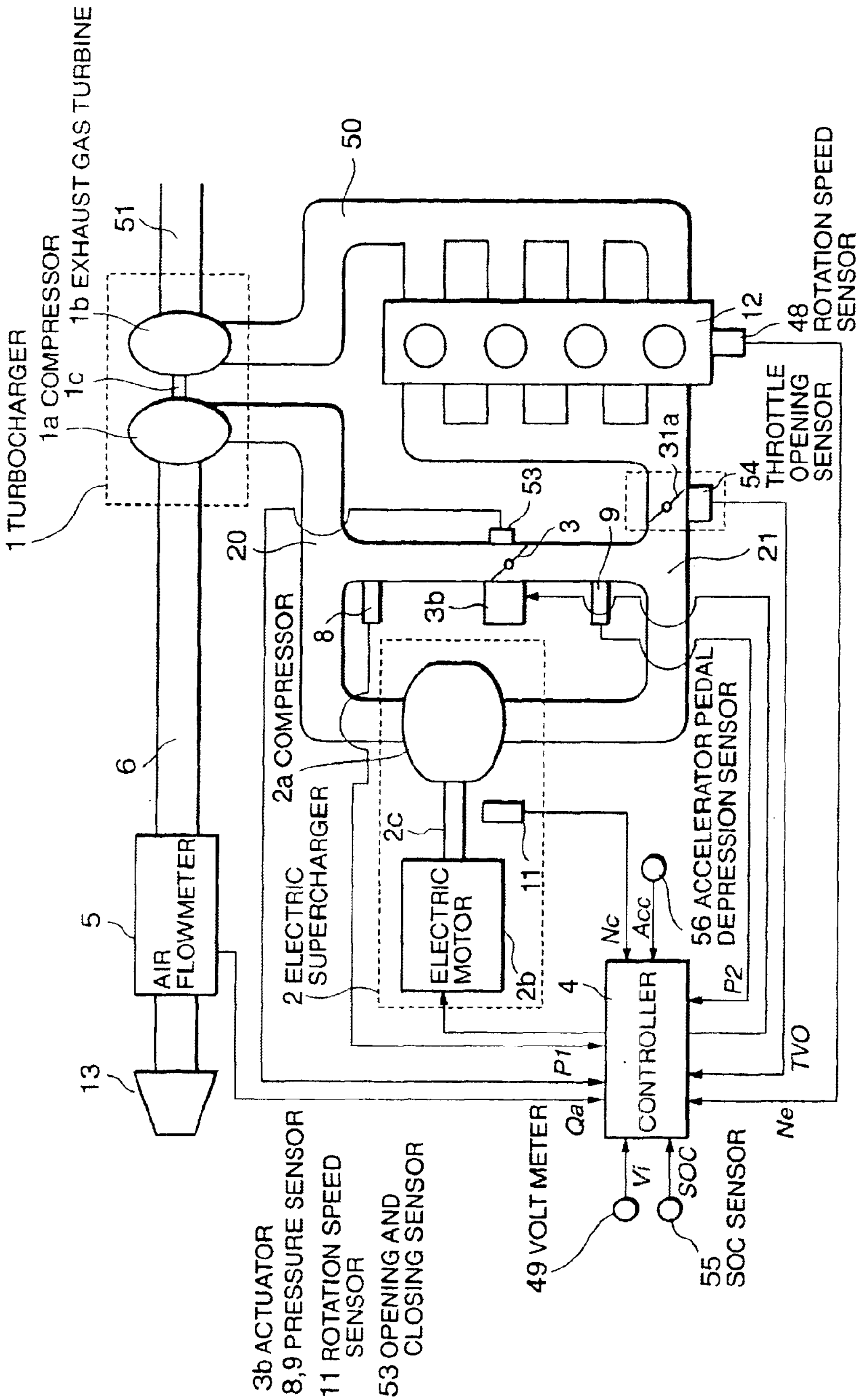
FIG. 18 is a schematic diagram of an internal combustion engine provided with a supercharging device according to a ninth embodiment of this invention.

Referring to FIG. 18, the supercharging device according to this embodiment is provided with an opening and closing sensor 53 which detects whether the bypass valve 3 is in the closed position, an engine rotation speed sensor 48 which detects the rotation speed Ne of the engine 12, a voltmeter 49 which detects a power generation voltage Vi of an alternator, a SOC sensor 55 which detects a state of charge SOC of a battery, and an accelerator pedal depression sensor 56 which detects a depression amount Acc of an accelerator pedal with which the vehicle is provided. The voltmeter 49 detects the voltage Vi as a value representing the generated power of the alternator.

The throttle speed sensor 31 is also replaced by a throttle opening sensor 54 which detects the opening TVO of the throttle 31*a*. The alternator is an AC generator driven by the engine 12, while the battery stores the generated power of the alternator, and supplies the power to the electric motor 2*b*. The detection data of these sensors are inputted to the controller 4 as signals. The remaining hardware of the device is identical to that of the supercharging device of the first embodiment.

Figure 19:
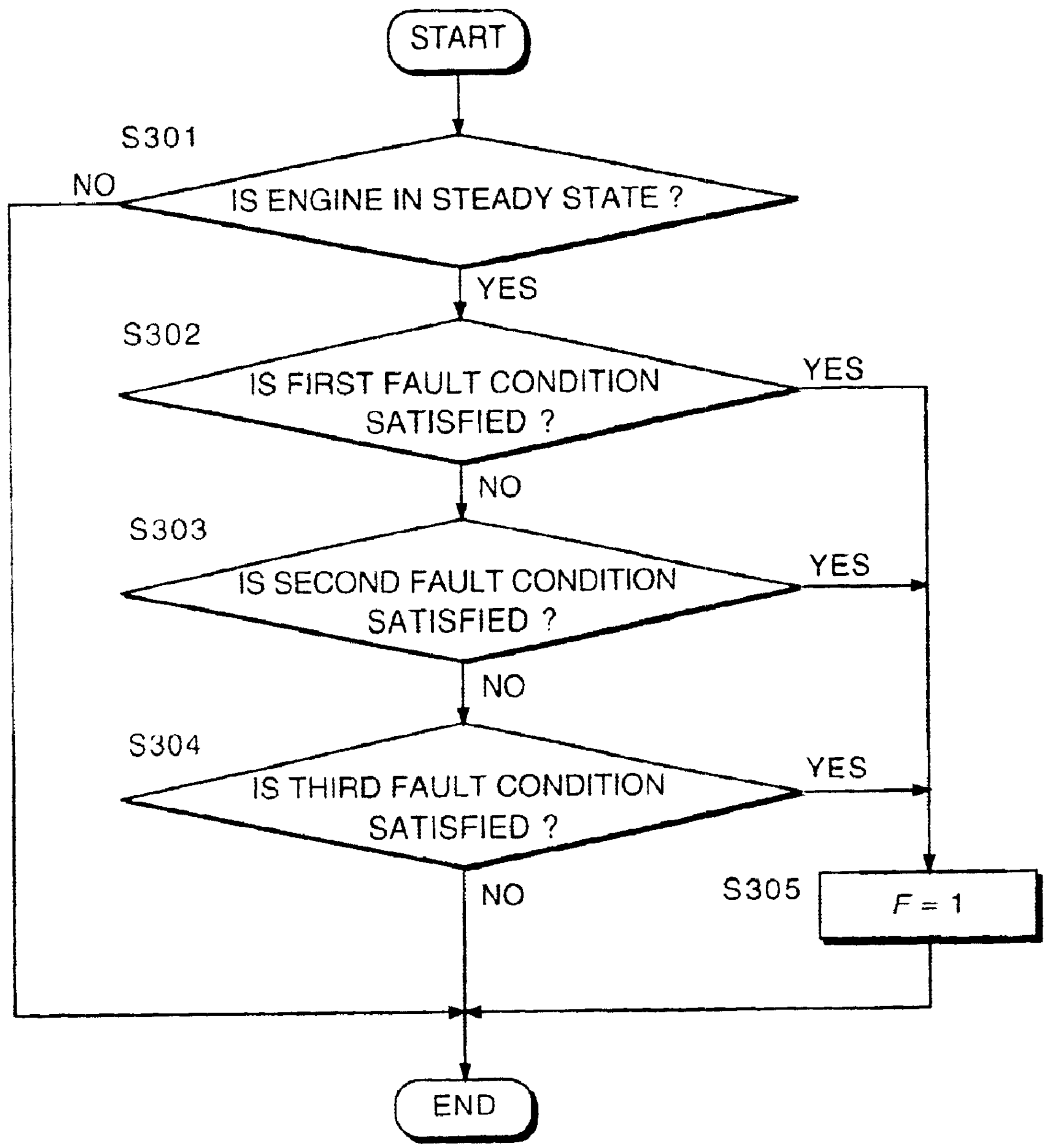
FIG. 19 is a flowchart describing a fault diagnosis routine in the steady state performed by the controller according to the ninth embodiment of this invention.
Figure 20:
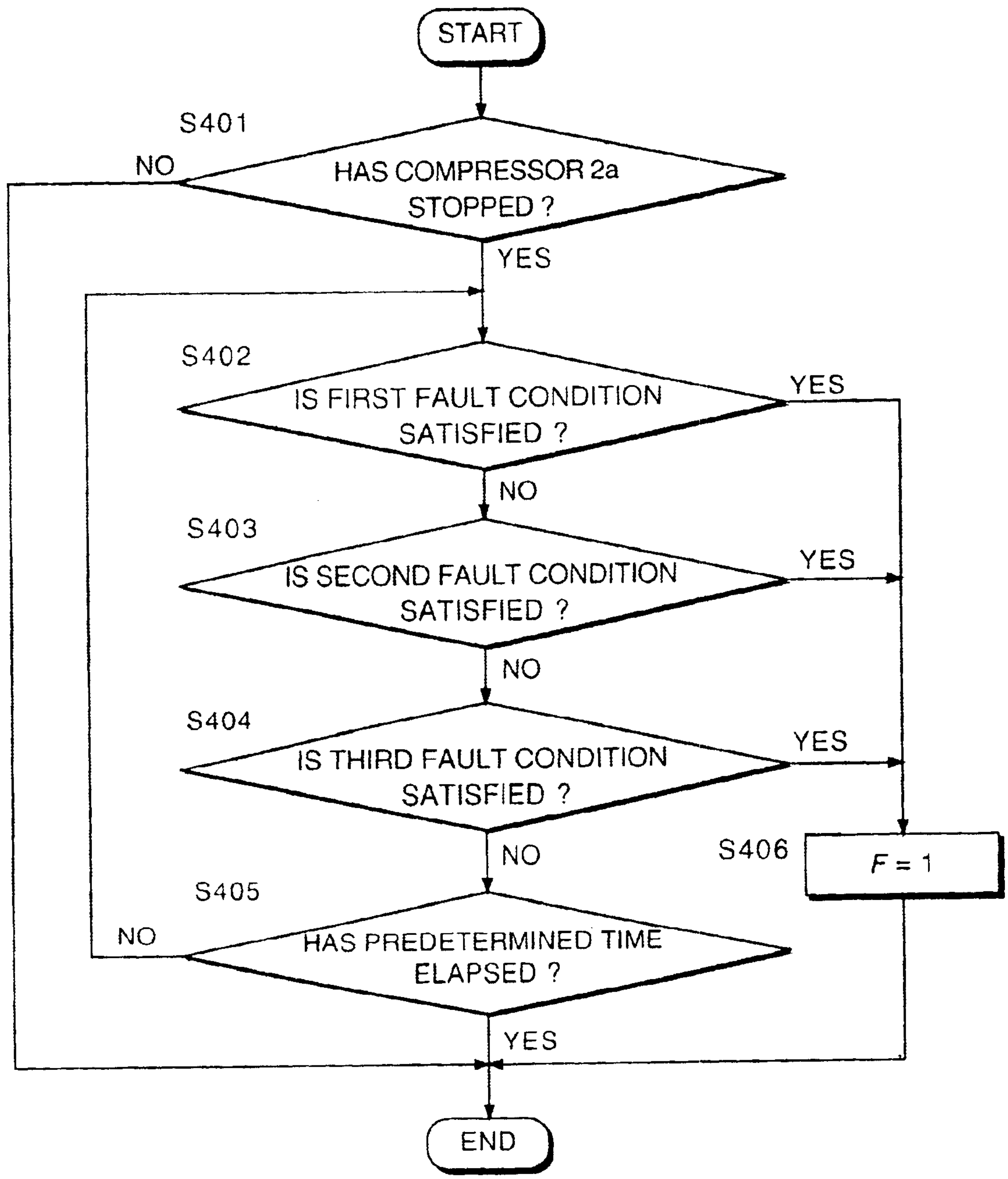
FIG. 20 is a flowchart describing a fault diagnosis routine immediately after stopping supercharging performed by the controller according to the ninth embodiment of this invention.

The controller 4 according to this embodiment performs the initial supercharging control routine of the first embodiment, second embodiment or seventh embodiment, and diagnoses faults in the bypass valve 3 by performing the routine for fault diagnosis of the bypass valve 3 shown in FIGS. 19 and 20. It also performs the fault processing routine shown in FIG. 21 to ensure that the intake air amount of the engine 12 is not deficient when there is a fault in the bypass valve 3. Herein, a fault of the bypass valve 3 means that the bypass valve 3 does not move from the closed position.

FIG. 19 shows the fault diagnosis routine in the steady state. This routine is performed at an interval of ten milliseconds at the same time as the initial supercharging control routine while the engine 12 is operating.

First, in a step S301, the controller 4 determines whether or not the engine 12 is in a steady state. Specifically, the state where the rotation speed Nc of the compressor 2*a* detected by the rotation speed sensor 11 is zero continues for a predetermined time, is determined as the steady state. If the state is not the steady state, the controller 4 terminates the routine immediately without performing further processing. In the steady state, in step S302, the controller 4 determines whether or not a first fault condition is satisfied.

The first fault condition is described below.

If the bypass valve 3 is fixed in the closed position, when the compressor 2*a* is not operated, or after a certain time has elapsed after termination of operation of the compressor 2*a*, the pressure of the intake passage 21 downstream of the compressor 2*a* is a highly negative pressure. When the compressor 2*a* stops, air can hardly pass the compressor 2*a* or the bypass valve 3 which is fixed in the closed position, so the flow of air from the intake passage 20 to the intake passage 21 will almost be shut off. If the engine 12 aspirates air in this state, the intake passage 21 will go to very high negative pressure. Therefore, in the step S302, it can be determined whether or not this first fault condition is satisfied by determining whether or not the pressure detected by the pressure sensor 9 is less than a preset pressure. Herein, the present pressure is set to, for example, 10 kilopascals (kPa).

When the first fault condition is satisfied in the step S302, the controller 4 performs the processing of a step S305.

When the first fault condition is not satisfied, the controller 4 determines whether or not a second fault condition is satisfied in a step S303.

The second fault condition is described below.

If the bypass valve 3 is fixed in the closed position, when the compressor 2*a* is not operated, or after a certain time has elapsed after termination of operation of the compressor 2*a*, the intake air flowrate Qa detected by the air flowmeter 5 decreases compared to the intake air flowrate of the engine 12 during normal operation which can be found from the opening TVO of the throttle 31*a*, and the rotation speed Ne of the engine 12. This is because, as air cannot pass either the compressor 2*a* or the bypass valve 3, the intake air flowrate of the intake passage 6 falls. It can be determined whether or not the second fault condition is satisfied by determining whether or not the intake air flowrate Qa is less than the intake air flowrate of the engine 12 calculated from the opening TVO of throttle 31*a*, and the rotation speed Ne of the engine 12.

When the second fault condition is satisfied in the step S303, the controller 4 performs the processing of the step S305. When the second fault condition is not satisfied, the controller 4 determines whether or not a third fault condition is satisfied in a step S304.

The third fault condition is described below.

When the compressor 2*a* is not operated, or after a certain time has elapsed after terminating operation of the compressor 2*a*, even when the controller 4 performs the initial supercharging control routine according to any of the first embodiment, second embodiment or seventh embodiment, the valve 3 must be open as a result of the processing of the step S20 or step S103.

However, when the bypass valve 3 is fixed in the closed position regardless of the processing of the step S20 or step S103, the signal inputted into the controller 4 from the opening and closing sensor 53 continues showing the closed position. Therefore, in the steady state, the controller 4 determines that the third fault condition is satisfied when the signal of the opening and closing sensor 53 continues showing the closed position.

When the third fault condition is satisfied in the step S304, the controller 4 performs the processing of the step S305.

When the third fault condition is not satisfied, the controller 4 terminates the routine.

As mentioned above, in the determination of the steps S302–S304, if any of the first-third fault conditions is satisfied, the controller 4 will perform the processing of the step S305. When none of the first-third fault conditions is satisfied, the controller 4 terminates the routine without performing anything. In the step S305, the controller 4 sets a fault flag F showing that a fault occurred in the bypass valve 3 to unity, and terminates the routine. The fault flag F takes the value of either zero or unity, and its initial value is zero.

Next, referring to FIG. 20, the fault diagnosis routine immediately after supercharging stops will be described.

This routine is performed only once when power supply to the electric motor 2*a* from the controller 4 is stopped.

First, in a step S401, the controller 4 determines whether or not the compressor 2*a* has stopped based on the detection speed Nc of the rotation speed sensor 11. When the compressor 2*a* has not stopped, fault diagnosis of the bypass valve 3 is difficult, so the controller 4 terminates the routine immediately without performing further processing.

When the compressor 2*a* has stopped, the controller 4, in a step S402, determines whether or not the first fault condition is satisfied. When the first fault condition is not satisfied, in a step S403, it is determined whether or not the second fault condition is satisfied. When the second fault condition is not satisfied, in a step S404, it is determined whether or not the third fault condition is satisfied. The first-third fault conditions are identical to the first-third fault conditions of the routine of FIG. 19.

When one of the fault conditions is satisfied, in a step S406, the controller 4 sets the fault flag F to unity and terminates the routine. When any of the first-third fault conditions is not satisfied, in the step S405, the controller 4 determines whether or not a predetermined time has elapsed since starting execution of the routine. If the predetermined time has not elapsed, the determination of the steps S402–404 is repeated. If the predetermined time has elapsed in the step S405, the controller 4 terminates the routine.

The fault diagnosis algorithms of the routine of FIG. 19 and the routine of FIG. 20 are identical, and the reason for separating them is as follows. Specifically, whereas according to the steady state routine of FIG. 19, diagnosis is performed periodically, in the routine immediately after supercharging stops of FIG. 20, diagnosis is repeated at a shorter interval during a transition period from when the compressor 2*a* stops until a predetermined time has elapsed. Thus, by separating the routines and shortening the diagnostic interval immediately after the compressor 2*a* stops, a fault of the bypass valve 3 can be immediately detected.

In the routines of FIGS. 19 and 20, to enhance determination accuracy, the first-third fault conditions are determined, but the order of these determinations can be set arbitrarily. Also, the fault flag F may be set by determining only one or two of the first-third fault conditions.

Among the first-third fault determinations, the determination of the first fault condition uses the detection pressure of the pressure sensor 9. The pressure sensor 9 is a sensor which detects the pressure P2 used for the initial supercharging control routine as mentioned above, and the fault condition can be determined using the existing sensor. For the determination of the second fault condition, the detection data from the air flowmeter 5, throttle opening sensor 54 and engine rotation speed sensor 48 are used. These sensors are generally used for the usual operation control of the engine 12, and the fault condition can be determined using the existing sensors. For the determination of the third fault condition, the closed position signal of the bypass valve 3 detected by the opening and closing sensor 53, is used. This sensor must be provided for fault diagnosis, and as it directly detects whether or not the bypass valve 3 is closed, the fixing of the bypass valve 3 in the closed position can be detected without fail.

Next, referring to FIG. 21, the fault processing routine performed by the controller 4 will be described. This routine is also performed at an interval of ten milliseconds at the same time as the initial supercharging control routine during operation of the engine 12.

First, in a step S501, the controller 4 determines whether or not the fault flag F is unity. When the fault flag F is not unity, a fault has not occurred in the bypass valve 3, so the controller 4 terminates the routine immediately without performing further processing. When the fault flag F is unity, in a step S502, the controller 4 determines the state of charge SOC of the battery based on the input signal from the SOC sensor 55. When SOC is more than a predetermined value, the controller 4 performs processing of a step S503.

When SOC is less than a predetermined value, the controller 4 determines whether or not the generation voltage Vi of the alternator detected by the ammeter 49 in the step S506 is more than a predetermined voltage. When the generation voltage Vi is more than the predetermined voltage, the controller 4 performs the processing of a step S503.

In the step S503, the controller 4 determines a target running speed of the vehicle based on the accelerator depression amount Acc detected by the accelerator pedal depression sensor 56.

After the processing of the step S503, the controller 4 performs the processing of a step S504.

On the other hand, in a step S506, when the generation voltage Vi is less than the predetermined voltage in a step S507, the controller 4 determines the target running speed of the vehicle based on the accelerator pedal depression amount Acc detected by the accelerator pedal depression sensor 56. In a following step S508, the controller 4 reduction corrects the target running speed according to the generation voltage Vi. After the processing of the step S508, the controller 4 performs the processing of a step S504.

In the step S504, the controller 4 supplies power to the electric motor 2*b* so that an intake air volume corresponding to the target running speed may be realized. After the processing of the step S504, the controller 4 terminates the routine.

If the fault flag F is set to unity by the above process, the controller 4 supplies power to the electric motor 2*b* within a range permitted by the battery capacity or the alternator generation power, and operates the compressor 2*a* accordingly. In this way, the air amount supplied to the engine 12 is secured so that a running speed corresponding to the accelerator pedal depression may be realized. Therefore, even when the bypass valve 3 is fixed in the closed position, the vehicle can run at a speed corresponding to the accelerator pedal depression.

Herein, the accelerator pedal depression represents the speed intended by the driver of the vehicle.

On the other hand, when there is not much battery capacity or alternator power available to drive the electric motor 2*b*, the target running speed is reduction corrected, and the power according to the running speed after correction is supplied to the electric motor 2*b*. By repeatedly performing this routine, the target running speed gradually falls.

Thus, since air is supplied to the engine 12 using available electric energy even if the bypass valve 3 is fixed in the closed position, the operation of the engine 12 does not stop immediately, and the vehicle can be driven to a place where the fault can be repaired.

In this embodiment, as the state of charge SOC of the battery is detected, it is possible also to detect the deterioration of the battery itself at an early stage.

Next, referring to FIG. 22, a tenth embodiment of this invention will be described.

Figure 21:
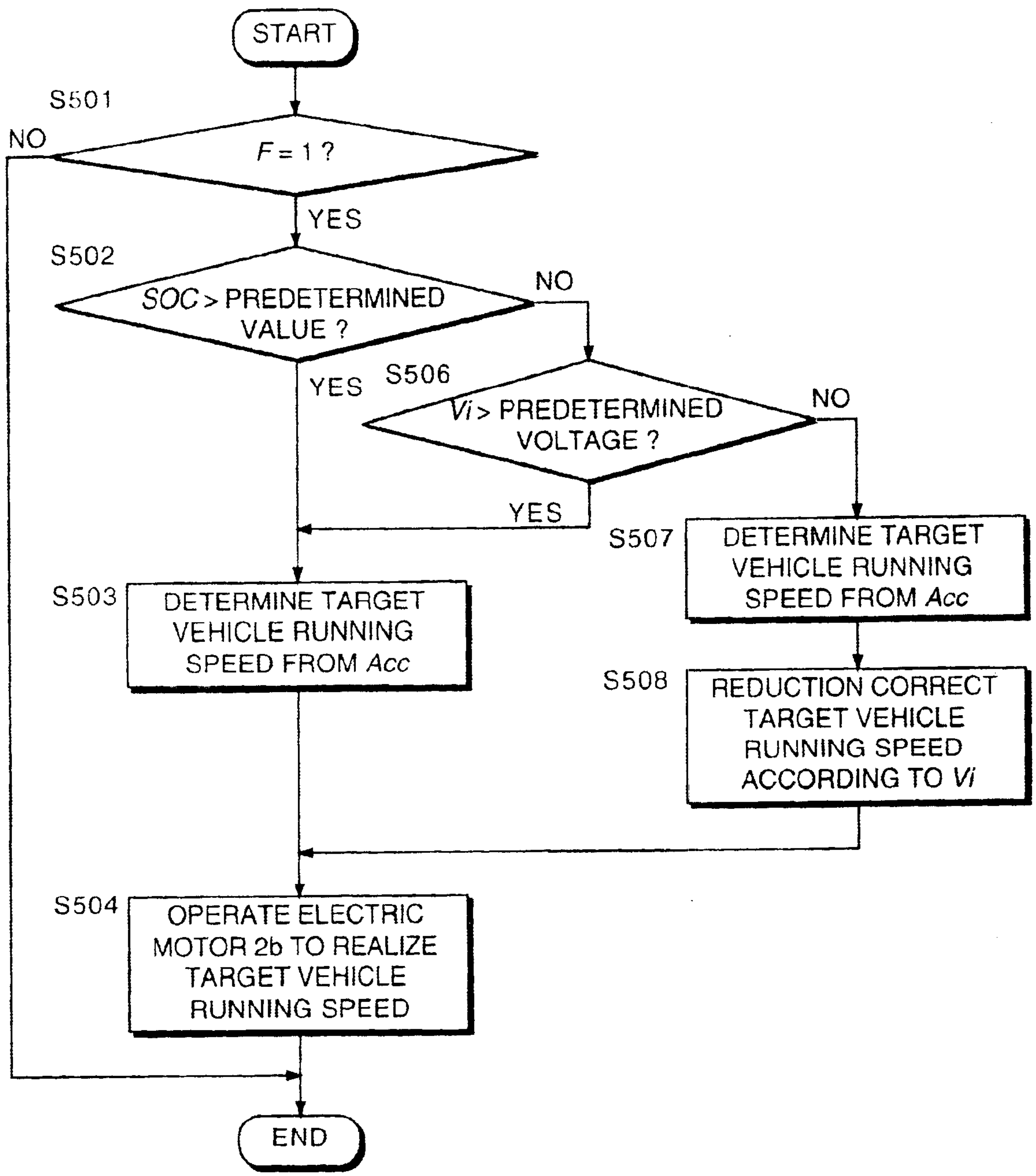
FIG. 21 is a flowchart describing a fault processing routine performed by the controller according to the ninth embodiment of this invention.
Figure 22:
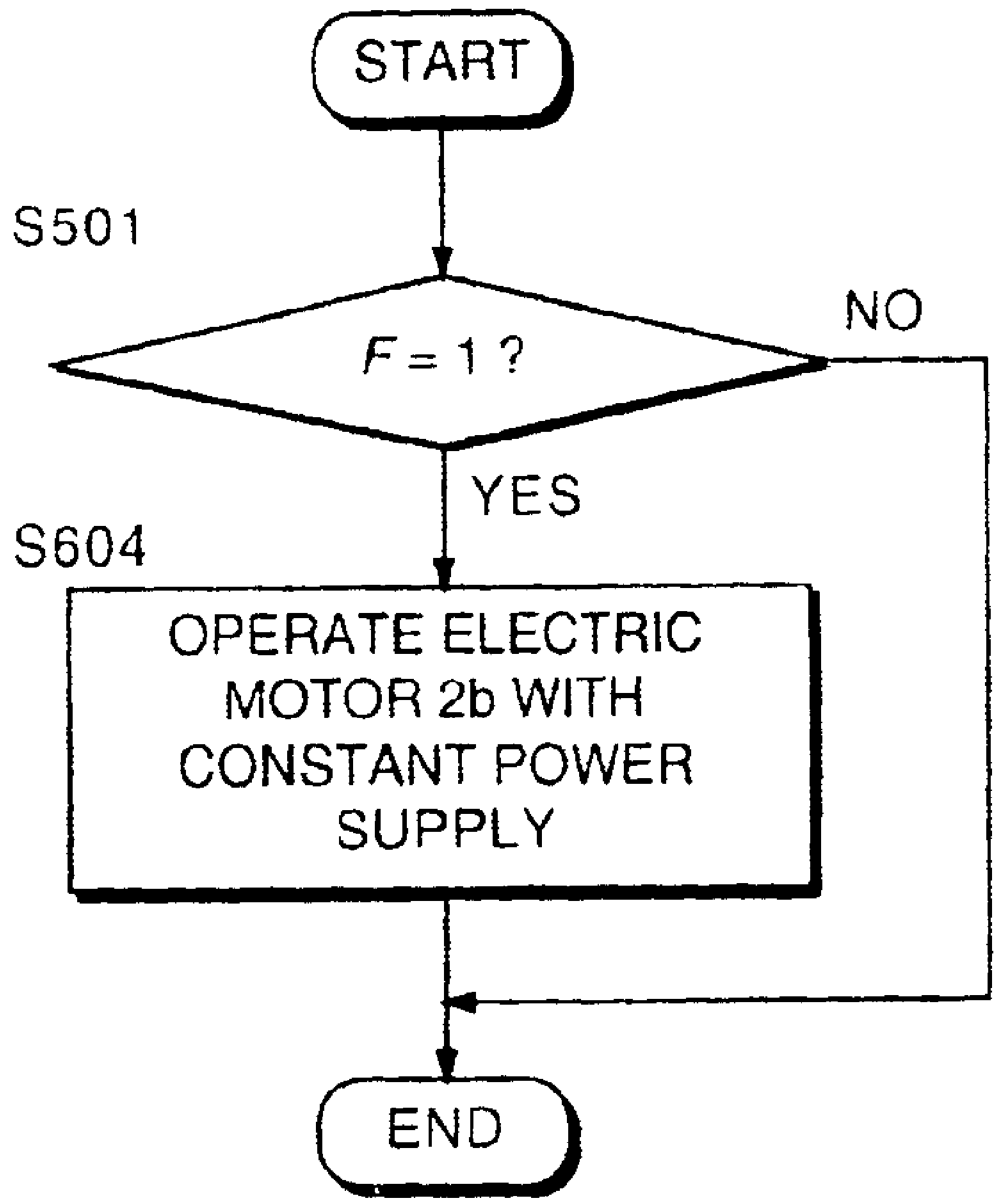
FIG. 22 is a flowchart describing a fault processing routine performed by a controller according to a tenth embodiment of this invention.

This embodiment relates to the fault processing routine, wherein the controller 4 performs the fault processing routine shown in FIG. 22 instead of the fault processing routine shown in FIG. 21. The remaining construction of the supercharging device of this embodiment is identical to that of the supercharging device according to the ninth embodiment.

Referring to FIG. 22, this routine omits the Steps S502, S503 and steps S506–S508 from the routine of FIG. 21, and replaces the step S504 by a step S604. In the step S501, the controller 4 determines whether or the fault determination flag F is unity. When the fault flag F is not unity, the routine is terminated immediately. When the fault flag F is unity, the controller 4 supplies power to the electric motor 2*b* in the step S604 and operates the compressor 2*a*.

In this case, the power supplied to the electric motor 2*b* is a constant value set based on the intake air amount of the engine 12 required for the vehicle to run on its own.

According to this embodiment, when the bypass valve 3 is fixed in the closed position, the electric motor 2*b* is driven so that an air amount sufficient for the vehicle to run on its own is supplied to the engine 12 regardless of the state of the battery or alternator, or the driver's intention, so the distance which can be run after the bypass valve 3 is fixed in a closed position becomes longer than in the supercharging device according to the ninth embodiment.

The contents of Tokugan 2002-238894 with a filing date of Aug. 20, 2002, Tokugan 2002-338999 with a filing date of Nov. 22, 2002, Tokugan 2003-044794 with a filing date of Feb. 21, 2003, Tokugan 2003-016201 with a filing date of Jan. 24, 2003 and Tokugan 2003-021667 with a filing date of Jan. 30, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in each of the above embodiments, the parameters required for control are detected using sensors, but this invention can be applied to any supercharging device which can perform the claimed control using the claimed parameters regardless of how the parameters are acquired.

The embodiments of this invention in which an exclusive property or privilege is claimed are defined as follows:

What is claimed is:

1. A supercharging device for an internal combustion engine, the engine comprising an intake passage, the device comprising:

- a first compressor installed in the intake passage, the compressor being driven by exhaust gas energy and supercharging intake air in the intake passage;
- a second compressor installed in the intake passage between the first compressor and engine, the second compressor being driven by an electric motor and supercharging air discharged from the first compressor;
- a bypass valve which bypasses the second compressor, the bypass valve being open when the second compressor is not operating, and starting to close at a certain time after the second compressor starts to operate;
- a sensor which detects a total intake air flowrate of the engine; and
- a programmable controller programmed to:
  - calculate a target rotation speed of the second compressor according to the total intake air flowrate of the engine, calculate a predicted rotation speed of the second compressor after a predetermined time has elapsed from the present time, and start to close the bypass valve when the predicted rotation speed has reached the target rotation speed.

2. The supercharging device as defined in claim 1, wherein the predetermined time is set equal to the time required for closure of the bypass valve.

3. The supercharging device as defined in claim 1, wherein the supercharging device further comprises a bypass passage which connects the intake passage upstream of the second compressor and the intake passage downstream of the second compressor, the bypass valve being provided in the bypass passage, a first intercooler, installed in the intake passage upstream of the second compressor between a branch point of the intake passage with the bypass passage and the second compressor, and a second intercooler installed in the intake passage downstream of the second compressor between a branch point of the intake passage with the bypass passage and the engine.

4. The supercharging device as defined in claim 1, wherein the supercharging device further comprises a speed increase mechanism which connects the second compressor and the electric motor.

5. The supercharging device as defined in claim 1, wherein the supercharging device further comprises a bypass passage which connects the intake passage upstream of the second compressor and the intake passage downstream of the second compressor, the bypass valve being provided in the bypass passage, and an intercooler which cools the intake air, the intercooler being installed in the intake passage upstream of the second compressor between a branch point of the intake passage with the bypass passage and the first compressor.

6. The supercharging device as defined in claim 5, wherein the supercharging device further comprises a second intercooler which cools the intake air, the second intercooler being installed in the intake passage downstream of the second compressor between a branch point of the intake passage with the bypass passage and the engine.

7. The supercharging device as defined in claim 1, wherein the supercharging device further comprises a sensor which detects a rotation speed of the second compressor, and the controller is further programmed to calculate the predicted rotation speed based on the rotation speed of the second compressor.

8. The supercharging device as defined in claim 7, wherein the controller is further programmed to calculate a rotation increase rate estimation value from the rotation speed of the second compressor at the present time, the rotation increase rate estimation value decreasing according to an increase of the rotation speed of the second compressor, and calculate the predicted rotation speed from the rotation increase rate estimation value and the rotation speed of the second compressor at the present time.

9. The supercharging device as defined in claim 8, wherein the controller is further programmed to calculate a real rotation increase rate from the rotation speed of the second compressor, and correct the rotation increase rate estimation value based on the real rotation increase rate.

10. The supercharging device as defined in claim 8, wherein the supercharging device further comprises a drive motor which drives the second compressor and a sensor which detects a current supplied to the electric motor, and the controller is further programmed to correct the predicted rotation speed based on the current supplied to the electric motor of the second compressor.

11. The supercharging device as defined in claim 8, wherein the supercharging device further comprises a drive motor which drives the second compressor and a sensor which detects a voltage supplied to the electric motor, and the controller is further programmed to correct the predicted rotation speed based on the voltage supplied to the electric motor of the second compressor.

12. The supercharging device as defined in claim 1, wherein the supercharging device further comprises a sensor which detects a parameter relating to fixing of the bypass valve in a closed position, and wherein the programmable controller is further programmed to determine whether or not the bypass valve is fixed in the closed position based on the parameter, and supply power to the electric motor to operate the second compressor when the bypass valve is fixed in the closed position.

13. The supercharging device as defined in claim 12, wherein the controller is further programmed to perform a determination as to whether or not the bypass valve is fixed in the closed position at a fixed interval after a predetermined time has elapsed from startup of the second compressor, and perform the determination at a shorter interval than the fixed time interval until the predetermined time has elapsed from startup of the second compressor.

14. The supercharging device as defined in claim 12, wherein the controller is further programmed to supply a fixed power to the electric motor when the bypass valve is fixed in the closed position.

15. The supercharging device as defined in claim 12, wherein the internal combustion engine is an engine which drives a vehicle, the vehicle comprising an accelerator pedal, the supercharging device further comprises a sensor which detects an accelerator pedal depression, and the controller is further programmed to set a target running speed of the vehicle according to the accelerator pedal depression, and to supply power to the electric motor according to the target running speed.

16. The supercharging device as defined in claim 12, wherein the vehicle further comprises an alternator driven by the engine and a battery which stores power generated by the alternator and supplies power to the electric motor, the supercharging device further comprises a sensor which detects a state of charge of the battery and a sensor which detects a power generation state of the alternator, and the controller is further programmed to decrease the target running speed when the state of charge of the battery has not reached a predetermined state of charge and the power generation state of the alternator has not reached a predetermined power generation state.

17. The supercharging device as defined in claim 12, wherein the parameter detecting sensor comprises a pressure sensor which detects a pressure of the intake passage between the second compressor and the engine, and the controller is further programmed to determine that the bypass valve is fixed in the closed position when the pressure is equal to or less than a predetermined pressure after the operation of the second compressor has stopped.

18. The supercharging device as defined in claim 12, wherein the internal combustion engine is an engine which drives a vehicle, the vehicle comprising an accelerator pedal, the engine comprises a throttle which is installed in the intake passage downstream of the bypass valve and increases or decreases a total intake air flowrate of the engine according to an operation of the accelerator pedal, the parameter detecting sensor comprises an air flowmeter which detects the total intake air flowrate of the engine, a rotation speed sensor which detects a rotation speed of the engine, and a throttle opening sensor which detects an opening of the throttle, and the controller is further programmed to determine that the bypass valve is fixed in the closed position when the total intake air flowrate detected by the air flowmeter when the operation of the second compressor has stopped is less than an intake air flowrate of the engine calculated from the rotation speed of the engine and the opening of the throttle.

19. The supercharging device as defined in claim 12, wherein the parameter detecting sensor comprises an opening and closing sensor which detects whether or not the bypass valve is in the closed position, and the controller is further programmed to determine that the bypass valve is fixed in the closed position when the bypass valve is still in the closed position after the operation of the second compressor has stopped.

20. A supercharging device for an internal combustion engine, the engine comprising an intake passage, the device comprising:

a first compressor installed in the intake passage, the compressor being driven by exhaust gas energy and supercharging intake air in the intake passage;

a second compressor installed in the intake passage between the first compressor and engine, the second compressor being driven by an electric motor and supercharging air discharged from the first compressor; and a bypass valve which bypasses the second compressor, the bypass valve being open when the second compressor is not operating, and starting to close at a certain time after the second compressor starts to operate, wherein the supercharging device further comprises a sensor which detects a flowrate parameter relating to an air flowrate of the bypass valve, and a programmable controller programmed to determine whether or not the flowrate of the bypass valve is zero based on the flowrate parameter, and starts closing the bypass valve when the air flowrate of the bypass valve is zero; and wherein the flowrate parameter detecting sensor comprises an air flowmeter which detects a total intake air flowrate of the engine, a pressure sensor which detects a pressure of the intake passage upstream of the bypass valve, a rotation speed sensor which detects a rotation speed of the compressor, and an air temperature sensor which detects a temperature of the air pressurized by the compressor, and the controller is further programmed to calculate a discharge flowrate of the second compressor from the pressure upstream of the bypass valve, the rotation speed of the compressor and the temperature of the air pressurized by the second compressor, and determine that the air flowrate of the bypass valve is zero when the discharge flowrate of the second compressor is equal to the total intake air flowrate of the engine.

21. A supercharging device for an internal combustion engine, the engine comprising an intake passage, the device comprising:

a first compressor installed in the intake passage, the compressor being driven by exhaust gas energy and supercharging intake air in the intake passage;

a second compressor installed in the intake passage between the first compressor and engine, the second compressor being driven by an electric motor and supercharging air discharged from the first compressor; and a bypass valve which bypasses the second compressor, the bypass valve being open when the second compressor is not operating, and starting to close at a certain time after the second compressor starts to operate, wherein the supercharging device further comprises a sensor which detects a flowrate parameter relating to an air flowrate of the bypass valve, and a programmable controller programmed to determine whether or not the flowrate of the bypass valve is zero based on the flowrate parameter, and starts closing the bypass valve when the air flowrate of the bypass valve is zero; and wherein the engine further comprises a throttle which adjusts a total intake air flowrate of the engine, the supercharging device further comprises a sensor which detects an operation speed of the throttle, and the controller is further programmed to start the second compressor when the operation speed of the throttle is more than a predetermined speed.

* * * * *